US010146121B2

United States Patent
Ikeura et al.

(10) Patent No.: US 10,146,121 B2
(45) Date of Patent: *Dec. 4, 2018

(54) PROJECTION TYPE IMAGE DISPLAY DEVICE AND CONTROL METHOD OF PROJECTION TYPE IMAGE DISPLAY DEVICE

(71) Applicant: SONY CORPORATION, Tokyo (JP)

(72) Inventors: Kazumasa Ikeura, Tokyo (JP); Jun Nishikawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/123,207

(22) PCT Filed: Mar. 31, 2015

(86) PCT No.: PCT/JP2015/001865
§ 371 (c)(1),
(2) Date: Sep. 1, 2016

(87) PCT Pub. No.: WO2015/170437
PCT Pub. Date: Nov. 12, 2015

(65) Prior Publication Data
US 2017/0068153 A1    Mar. 9, 2017

(30) Foreign Application Priority Data

May 7, 2014   (JP) ................. 2014-096327

(51) Int. Cl.
*H04N 9/31* (2006.01)
*G03B 21/53* (2006.01)
*G03B 21/14* (2006.01)

(52) U.S. Cl.
CPC .......... *G03B 21/53* (2013.01); *G03B 21/147* (2013.01); *H04N 9/317* (2013.01); *H04N 9/3185* (2013.01)

(58) Field of Classification Search
CPC ...... H04N 9/317; H04N 9/3185; G08B 21/03; G08B 21/1475
(Continued)

(56) References Cited

U.S. PATENT DOCUMENTS 6,592,228 B1 * 7/2003 Kawashima ........... G03B 21/11
348/745
2004/0061838 A1 * 4/2004 Mochizuki ............... H04N 5/74
353/69
(Continued)

FOREIGN PATENT DOCUMENTS

EP    1 560 429 A2   8/2005
EP    1 806 612 A1   7/2007
(Continued)

OTHER PUBLICATIONS

Notification of Transmittal of International Preliminary Report on Patentability dated Aug. 19, 2016 in PCT/JP2015/001865.
(Continued)

*Primary Examiner* — Michael Lee
(74) *Attorney, Agent, or Firm* — Oblon, McClelland, Maier & Neustadt, L.L.P.

(57) ABSTRACT

A projection type image display device (100) including a light source (40), an illumination optical system (30) which uniformly radiates light flux emitted from the light source (40) onto a surface (SCR) of an image modulation element which becomes a primary image surface, a projection optical system, capable of being set at a distance very close to a focal distance of a projection image, which magnifies and projects image information of the primary image surface modulated by the image modulation element onto a projection surface which becomes a secondary image surface, and a corner focus control section capable of automatically adjusting a focal distance of at least corner regions of the
(Continued)

projection image to a focal distance corresponding to a projection distance of the projection image.

11 Claims, 21 Drawing Sheets

(58) Field of Classification Search
USPC .......................................................... 348/745
See application file for complete search history.

(56) References Cited

U.S. PATENT DOCUMENTS

| | | | |
|---|---|---|---|
| 2004/0179191 A1* | 9/2004 | Kitabayashi | G01M 11/0264 356/124 |
| 2004/0227830 A1* | 11/2004 | Kobayashi | H04N 9/317 348/294 |
| 2005/0168705 A1 | 8/2005 | Li et al. | |
| 2005/0195372 A1* | 9/2005 | Ohara | G03B 21/14 353/69 |
| 2008/0292304 A1* | 11/2008 | Hirai | G03B 21/005 396/430 |
| 2010/0208149 A1 | 8/2010 | Morikuni | |
| 2010/0214540 A1* | 8/2010 | Sajadi | G03B 3/00 353/101 |
| 2013/0107229 A1 | 5/2013 | Otani et al. | |
| 2015/0201171 A1* | 7/2015 | Takehana | H04N 9/317 353/70 |
| 2017/0045809 A1* | 2/2017 | Sasazaki | G03B 21/14 |

FOREIGN PATENT DOCUMENTS

| | | |
|---|---|---|
| JP | 10-213743 A | 8/1998 |
| JP | 2000-081601 A | 3/2000 |
| JP | 2004-347689 A | 12/2004 |
| JP | 2008-46291 A | 2/2008 |
| JP | 2009-294650 A | 12/2009 |
| JP | 2011-107295 A | 6/2011 |
| JP | 2013-097326 A | 5/2013 |
| JP | 2013-109186 A | 6/2013 |
| JP | 2014-32402 A | 2/2014 |

OTHER PUBLICATIONS

International Search Report dated Jul. 13, 2015 in PCT/JP15/001865 Filed Mar. 31, 2015.
Office Action dated Dec. 19, 2017 in Japanese Patent Application No. 2014-096327.
Office Action dated Jul. 20, 2018 in European Patent Application No. 15717261.0, p. 1-6.

* cited by examiner

[Fig. 1]
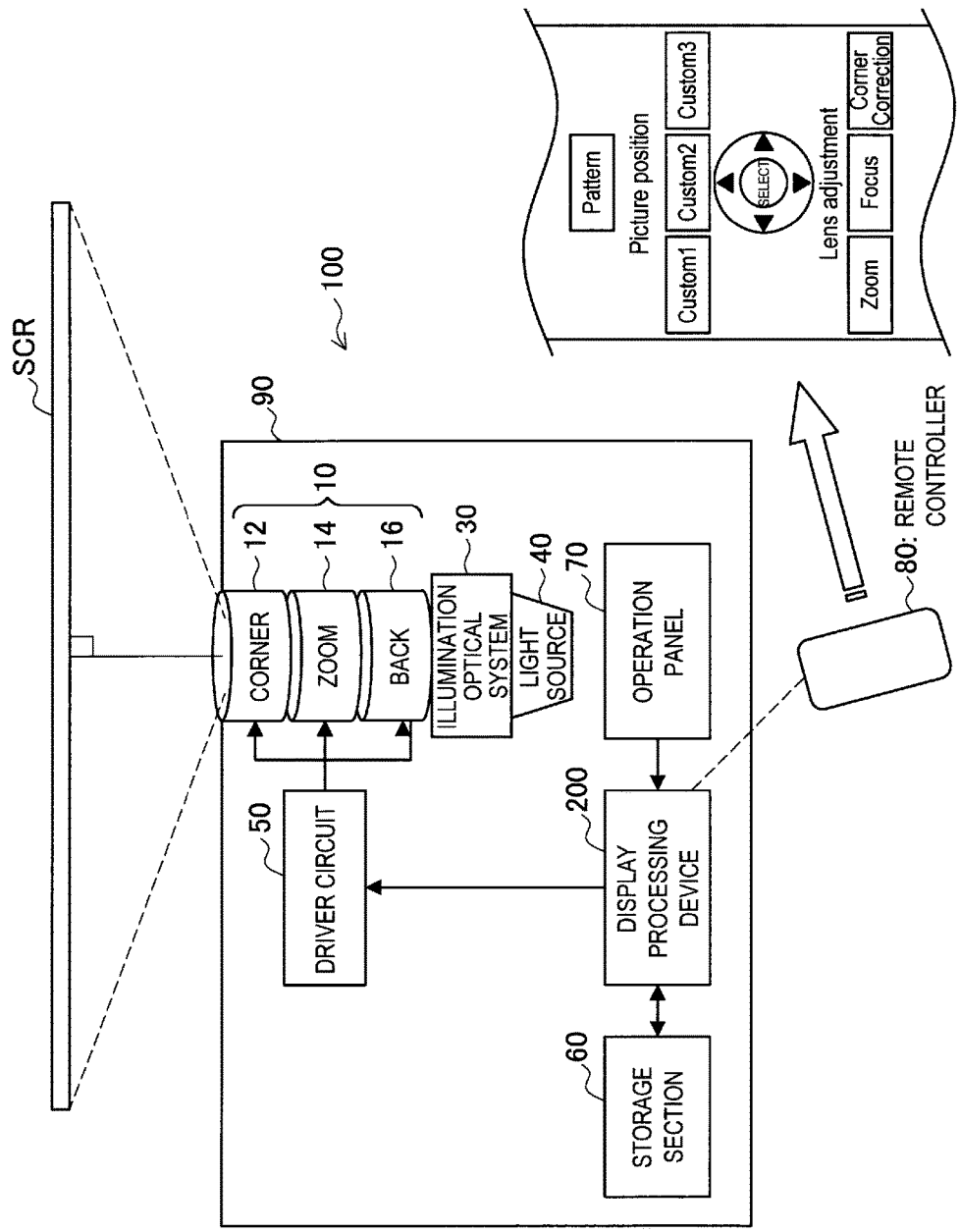

[Fig. 2]
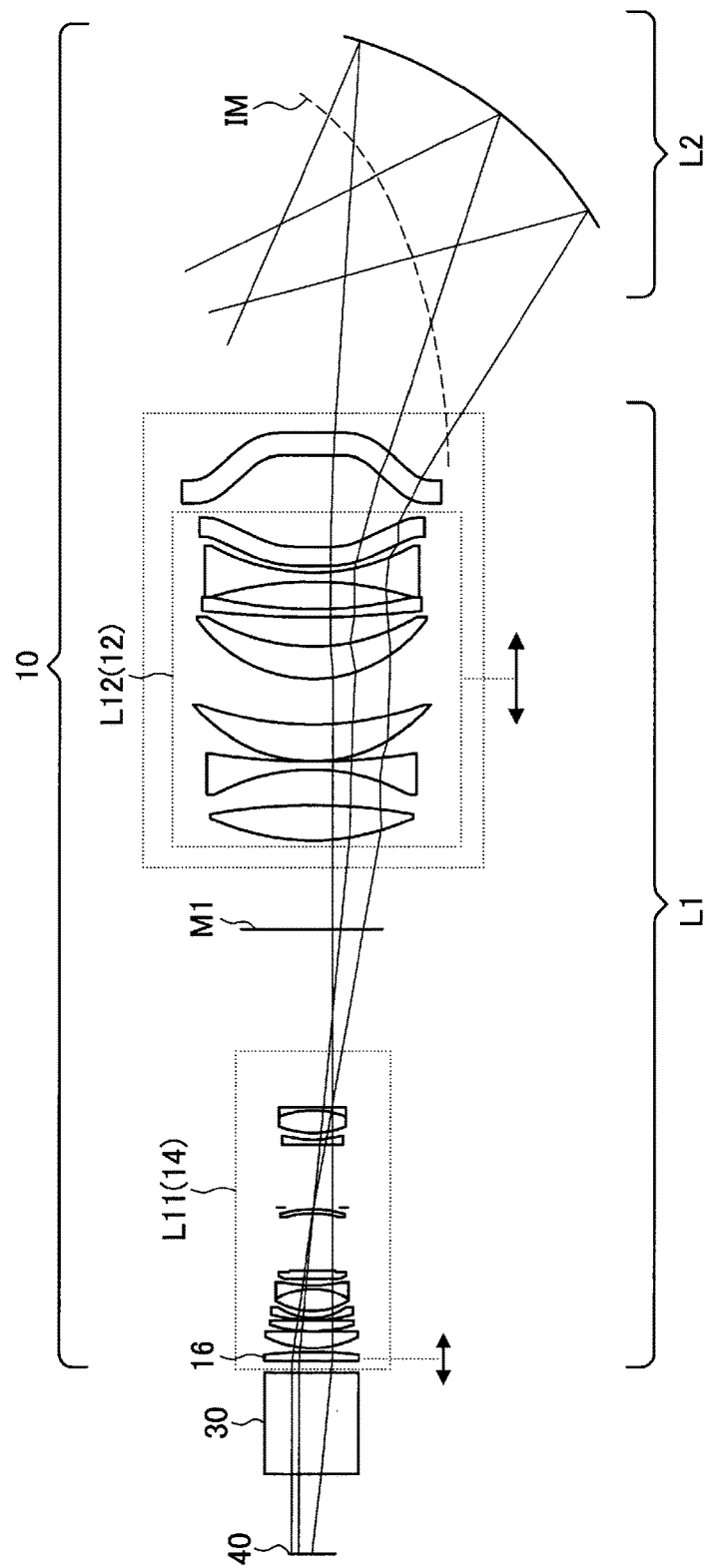

[Fig. 3]
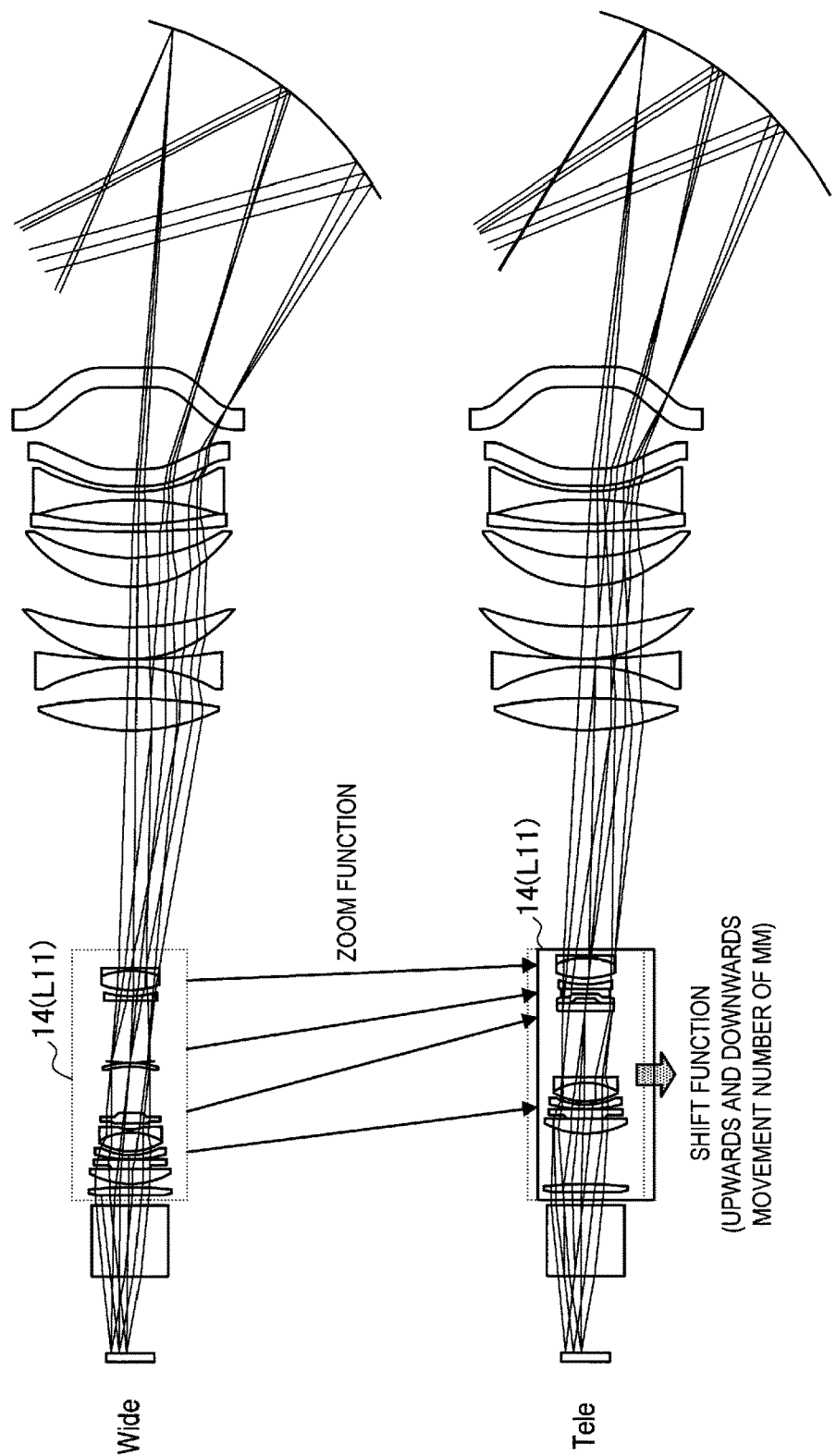

[Fig. 4]
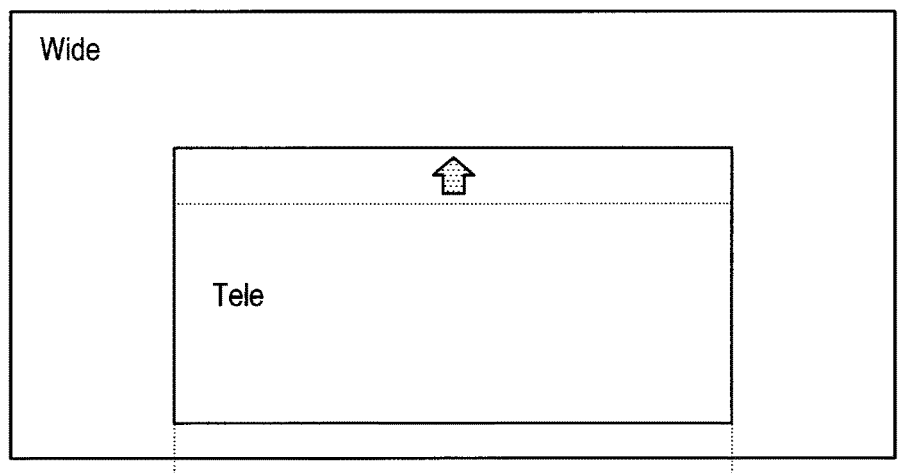

[Fig. 5]
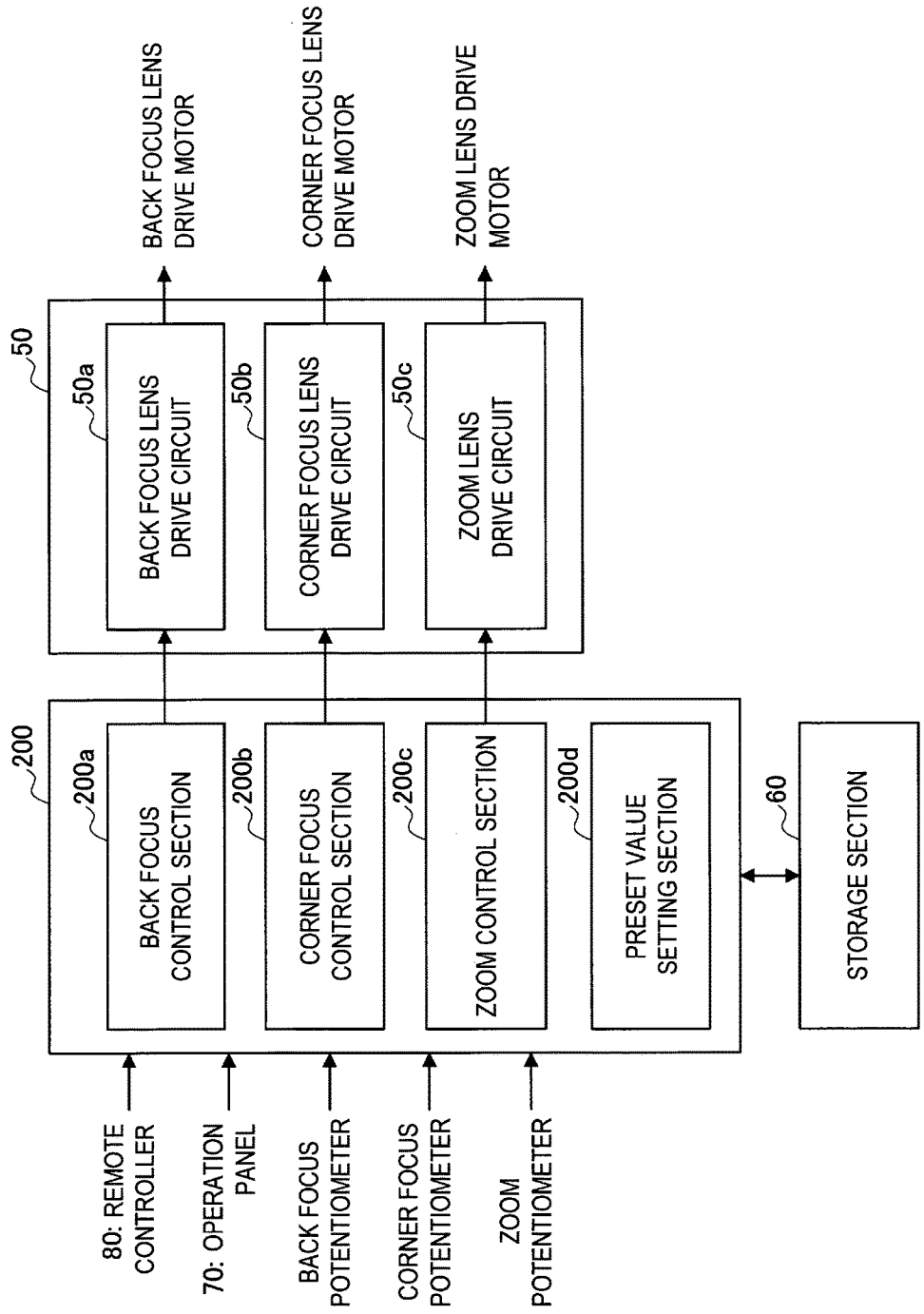

[Fig. 6]
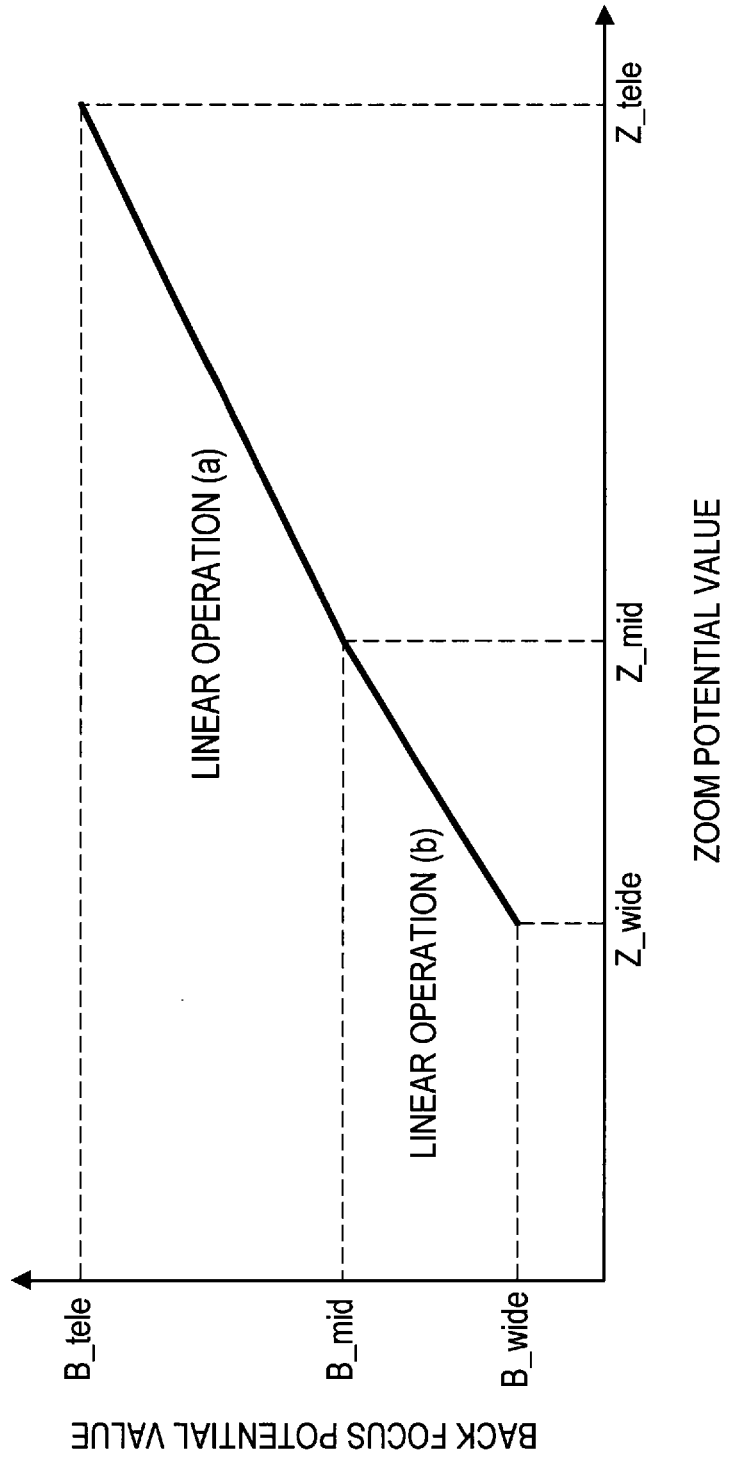

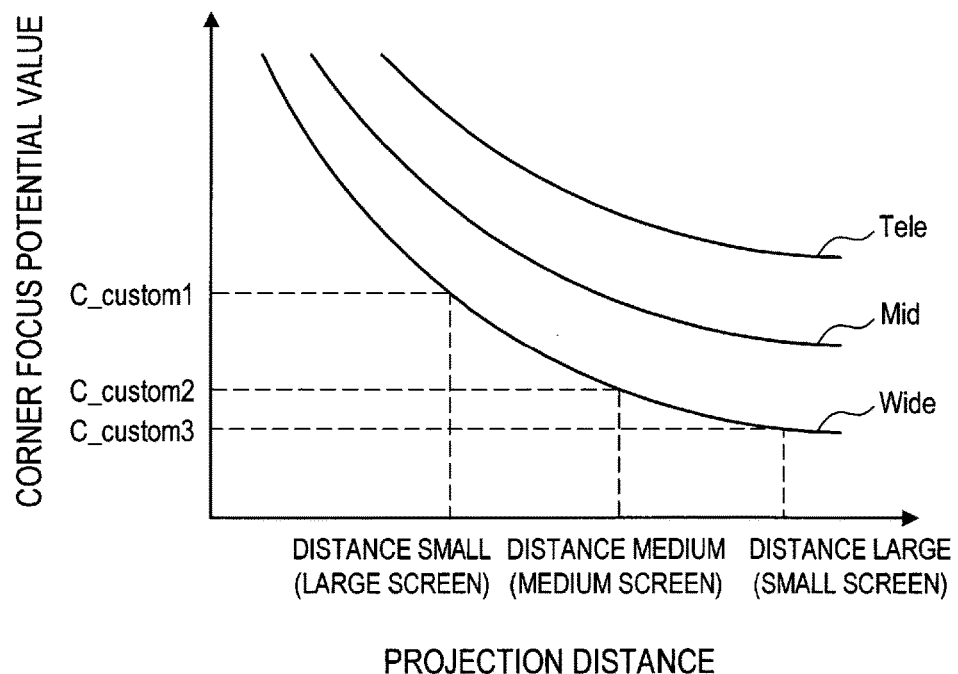

[Fig. 8]
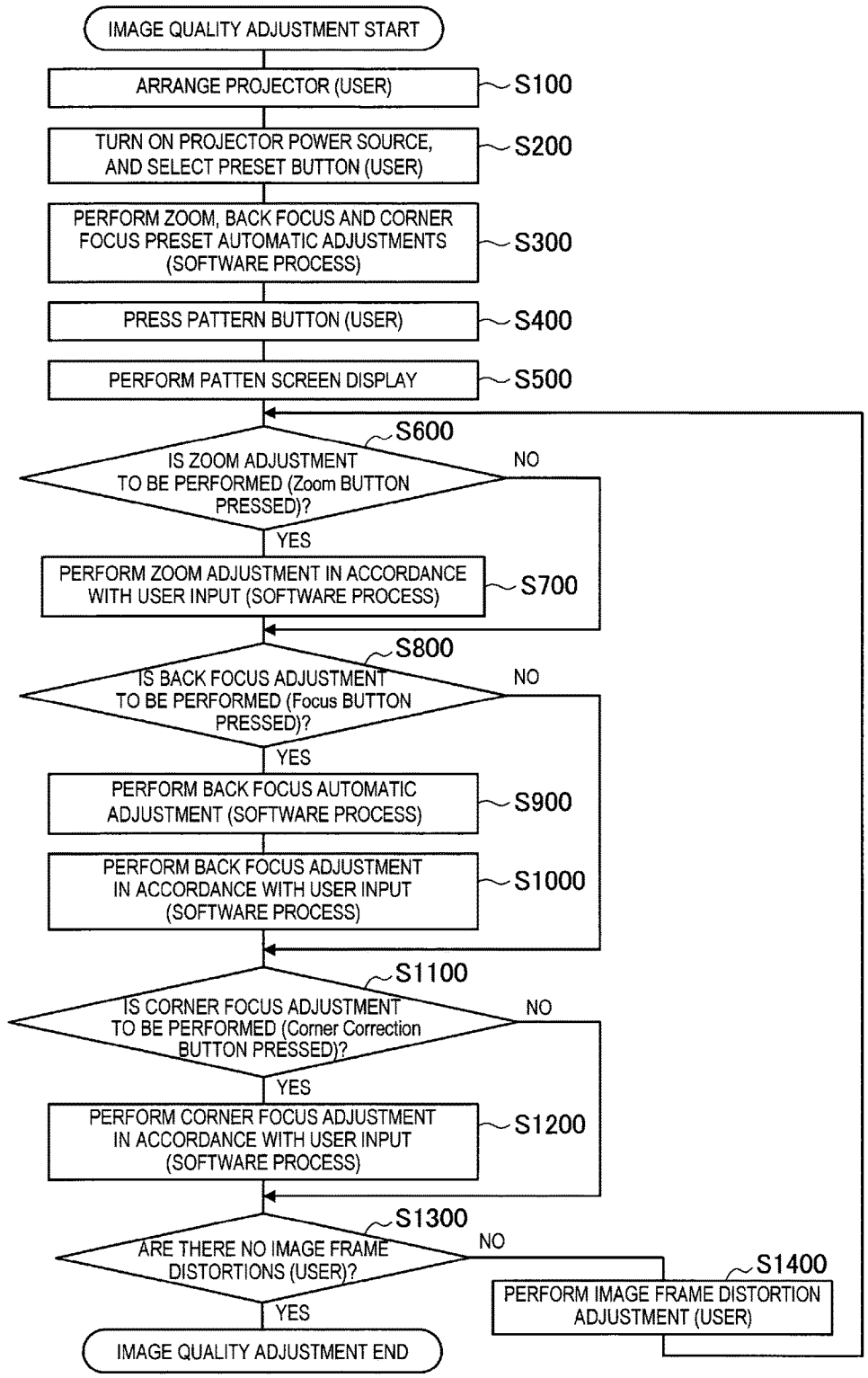

[Fig. 9]
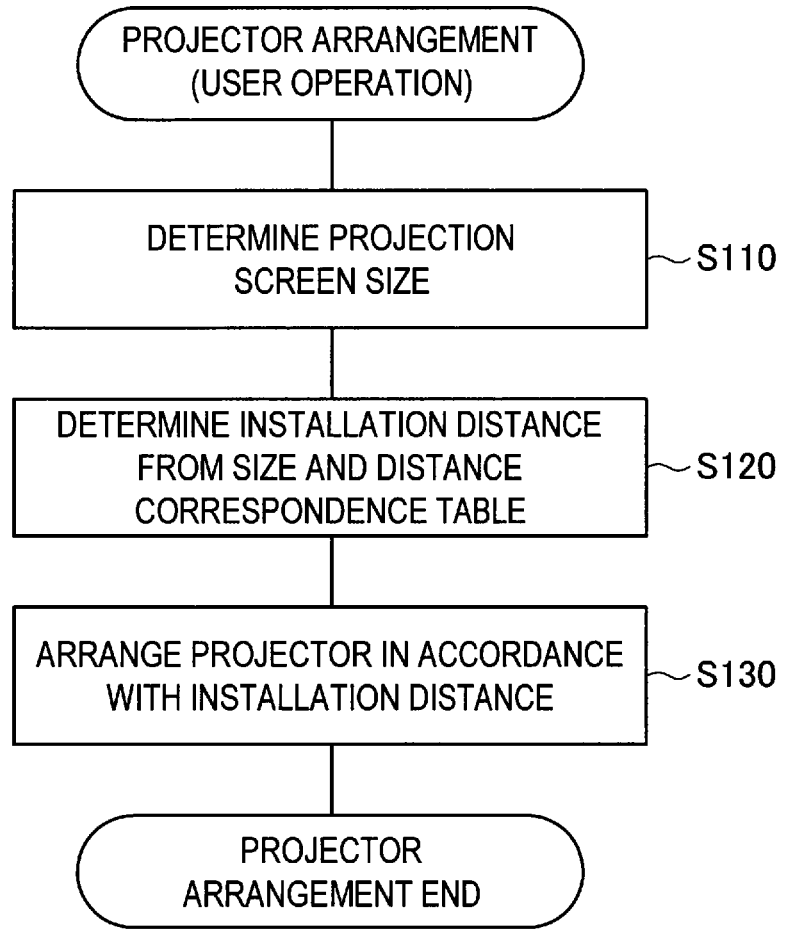

[Fig. 10]
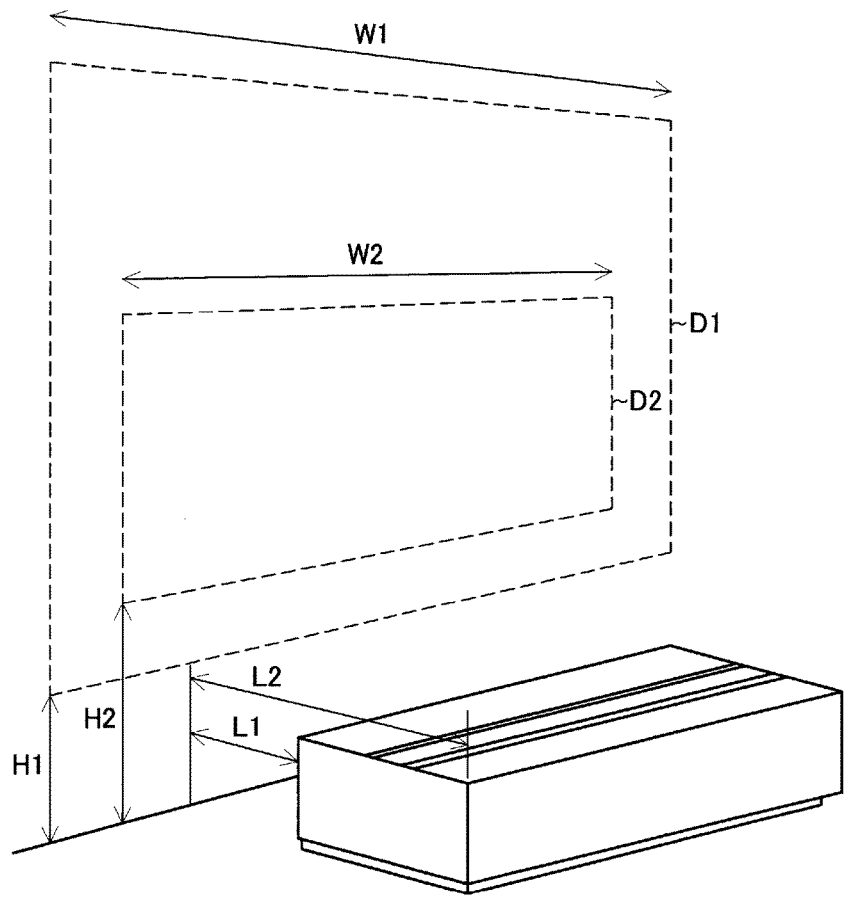
L1: DISTANCE FROM PROJECTION SURFACE UP TO MAIN BODY BACK SURFACE
L2: DISTANCE FROM PROJECTION SURFACE UP TO MAIN BODY FRONT SURFACE
D1: MAXIMUM SCREEN SIZE
D2: MINIMUM SCREEN SIZE
H1: DISTANCE FROM FLOOR SURFACE UP TO D1 SCREEN LOWER END
H2: DISTANCE FROM FLOOR SURFACE UP TO D2 SCREEN LOWER END

[Fig. 11]

|  | SCREEN SIZE ||||||  INSTALLATION DISTANCE ||
|  | MAXIMUM ||| MINIMUM ||| BACK SURFACE PART FROM PROJECTION SURFACE L1 | FRONT SURFACE PART FROM PROJECTION SURFACE L2 |
|  | OPPOSITE ANGLE D1 | HORIZONTAL × VERTICAL | LOWER END DISTANCE H1 | OPPOSITE ANGLE D2 | HORIZONTAL × VERTICAL | LOWER END DISTANCE H2 |  |  |
|---|---|---|---|---|---|---|---|---|
| AT TIME OF MAXIMUM SCREEN PROJECTION | 147 MODEL | 3.30m × 1.74m | 45cm | 92 MODEL | 2.07m × 1.09m | 57cm | 17cm | 70.5cm |
| INTERMEDIATE POSITION | 127 MODEL | 2.84m × 1.50m | 41cm | 79 MODEL | 1.78m × 0.94m | 51cm | 8.5cm | 62.0cm |
| AT TIME OF SHORTEST DISTANCE INSTALLATION | 106 MODEL | 2.39m × 1.26m | 38cm | 66 MODEL | 1.49m × 0.79m | 46cm | 0cm | 53.5cm |

CALCULATION EQUATIONS 1
(CALCULATE INSTALLATION DISTANCE FROM SCREEN SIZE)   UNITS: cm

| MAXIMUM SCREEN SIZE | MINIMUM SCREEN SIZE |
|---|---|
| $L1 = 0.1857 \times W1 - 44.3090$ | $L1 = 0.2964 \times W2 - 44.2027$ |
| $L2 = 0.1857 \times W1 + 9.1910$ | $L2 = 0.2964 \times W2 + 9.2973$ |

CALCULATION EQUATIONS 2
(CALCULATE SCREEN SIZE FROM INSTALLATION DISTANCE)   UNITS: cm

| BACK SURFACE PART FROM PROJECTION SURFACE | FRONT SURFACE PART FROM PROJECTION SURFACE |
|---|---|
| $W1 = 5.3850 \times L1 + 238.6044$ | $W1 = 5.3850 \times L2 - 49.4932$ |
| $W2 = 3.3734 \times L1 + 149.1119$ | $W2 = 3.3734 \times L1 - 31.3627$ |

CALCULATION EQUATIONS 3 (CALCULATE DISTANCE
FROM FLOOR UP TO PROJECTION SCREEN LOWER END)   UNITS: cm

| MAXIMUM SCREEN SIZE | MINIMUM SCREEN SIZE |
|---|---|
| $H1 = 0.0798 \times W1 + 18.6804$ | $H2 = 0.1830 \times W2 + 18.8798$ |

[Fig. 12]
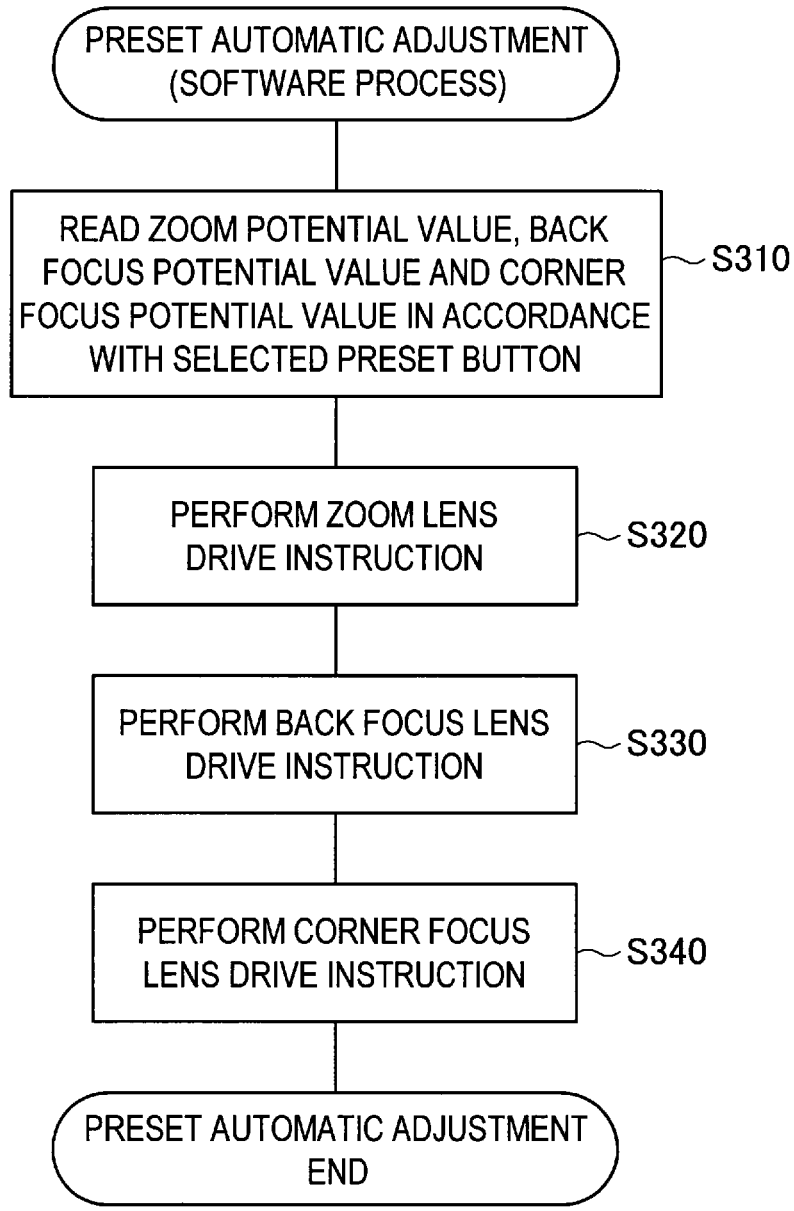

[Fig. 13]
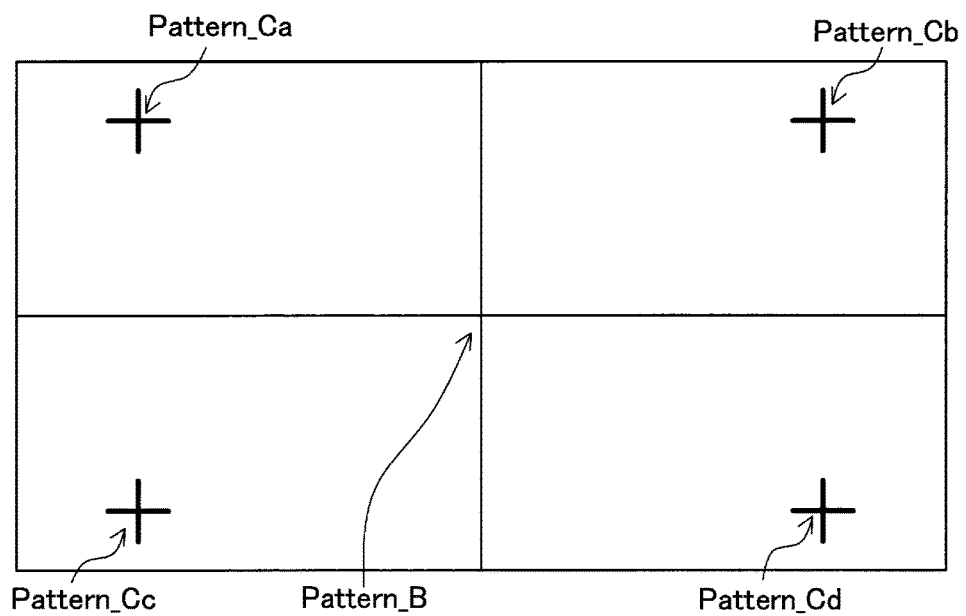

[Fig. 14]
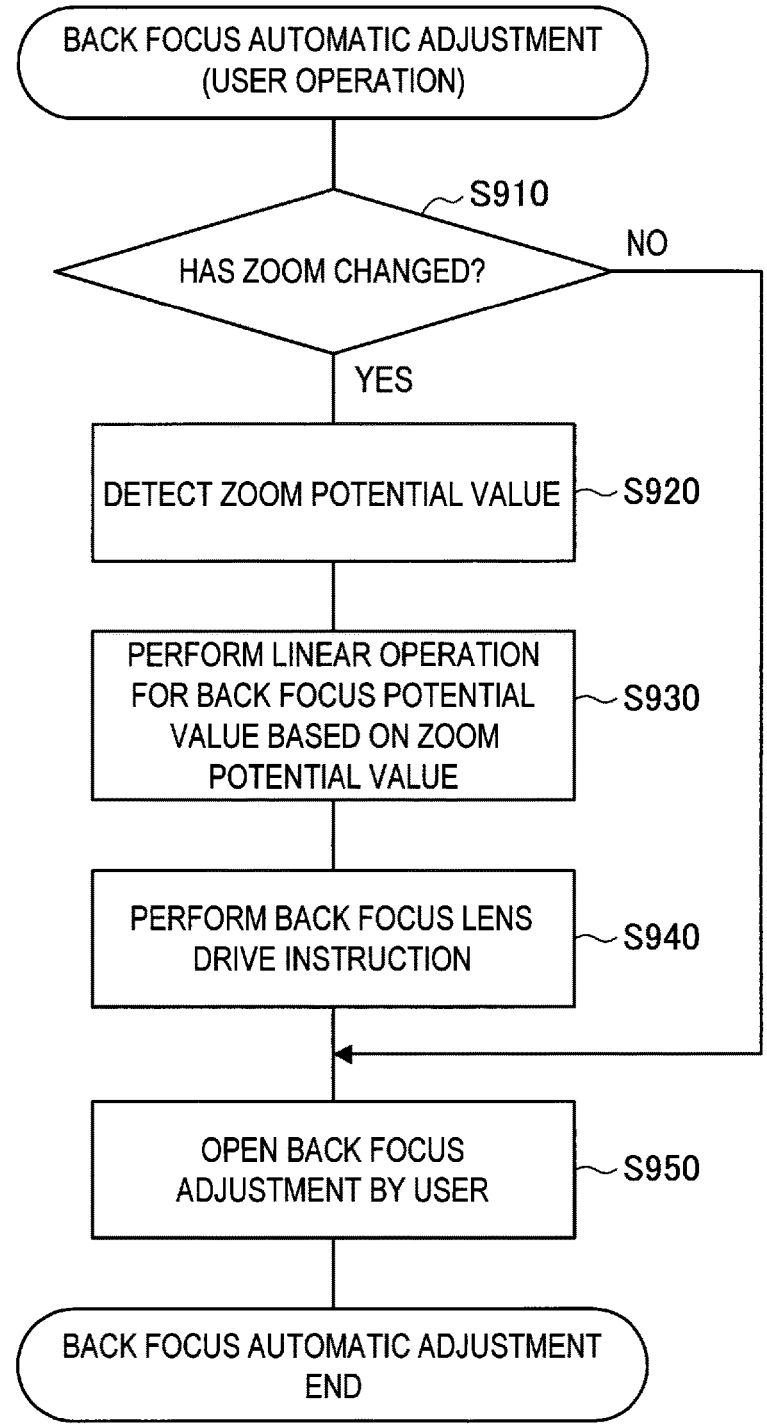

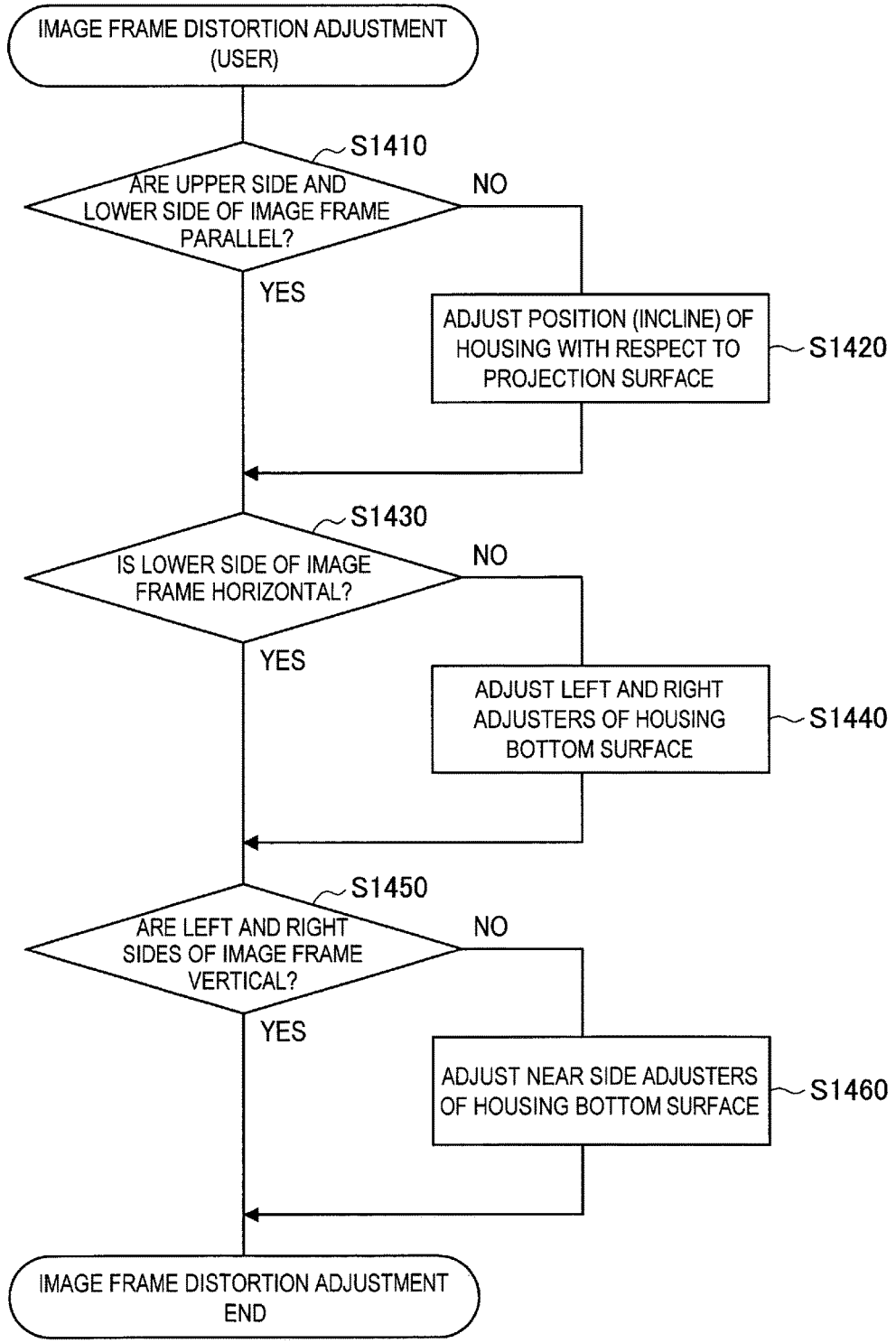
[Fig. 15]

[Fig. 16]
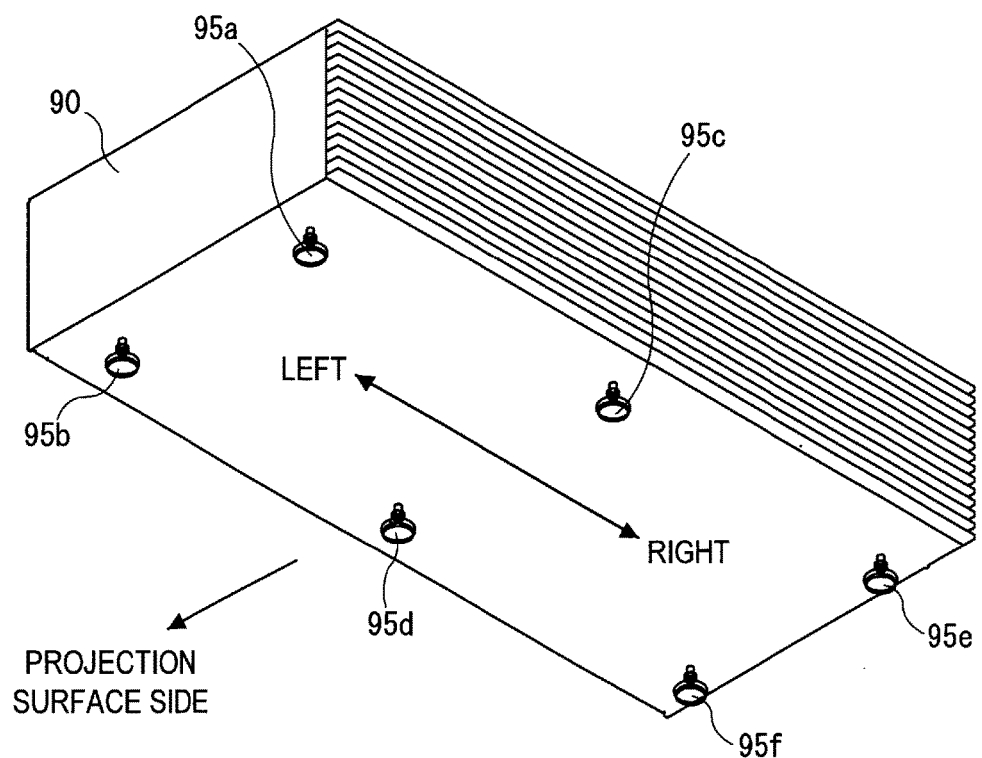

[Fig. 17]
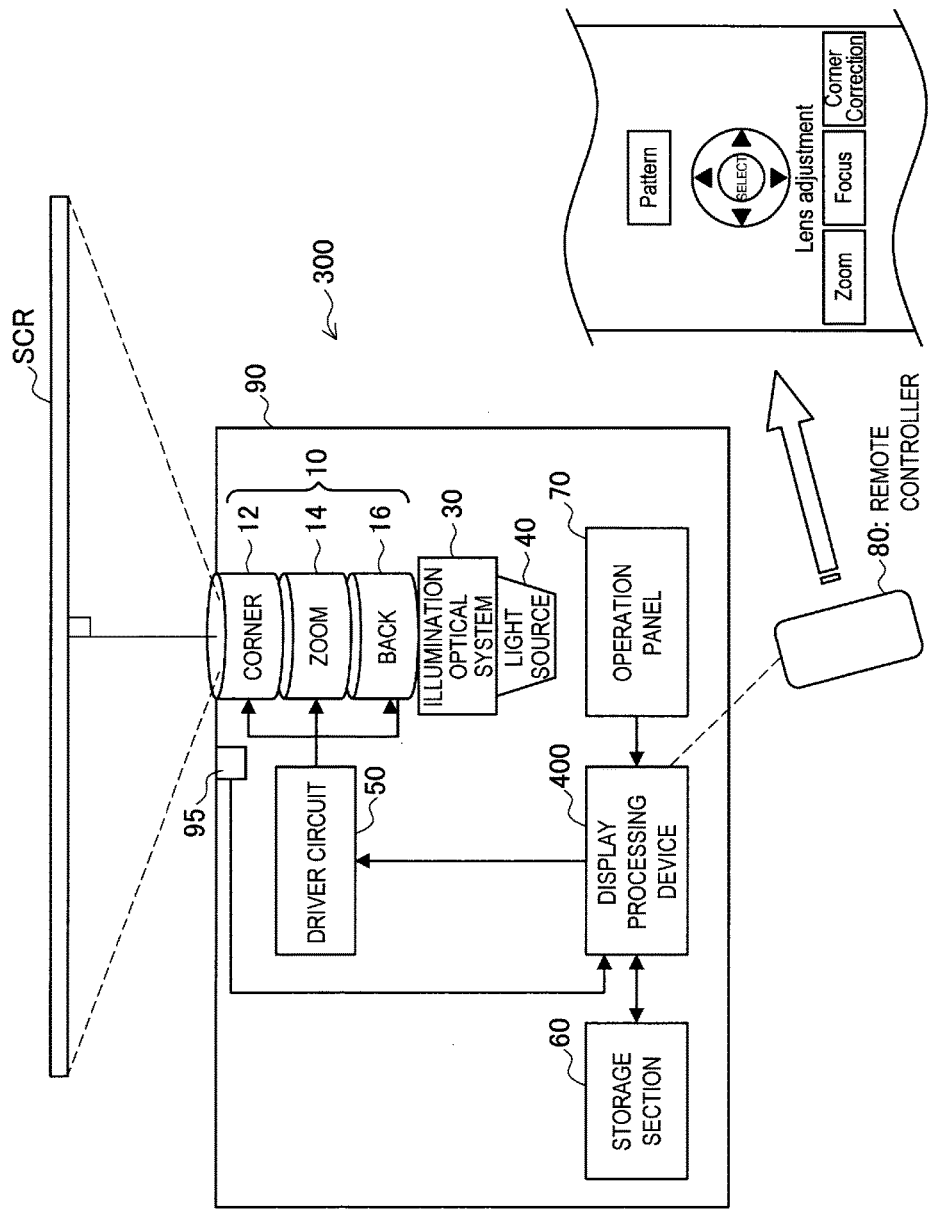

[Fig. 18]
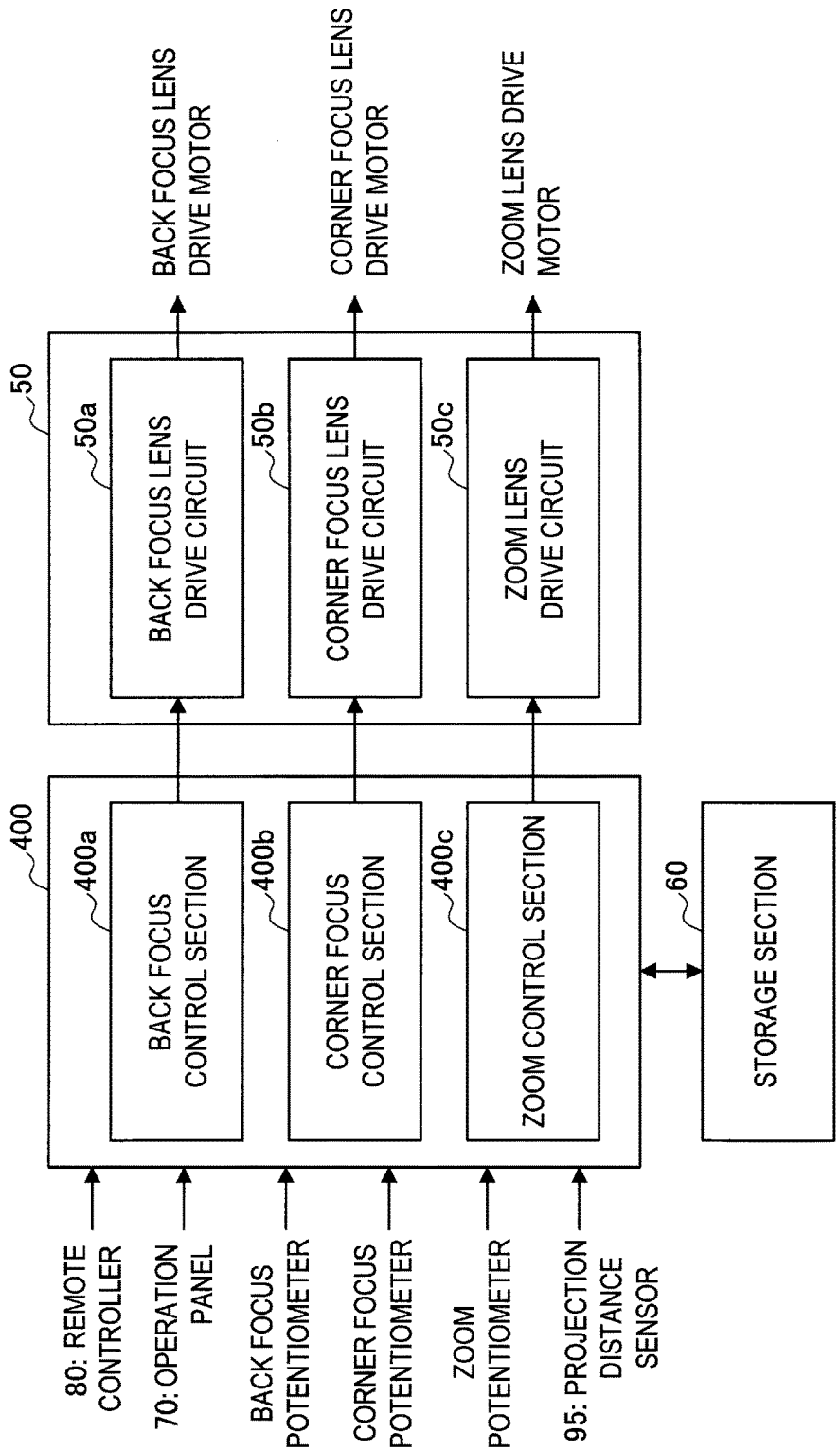

[Fig. 19]
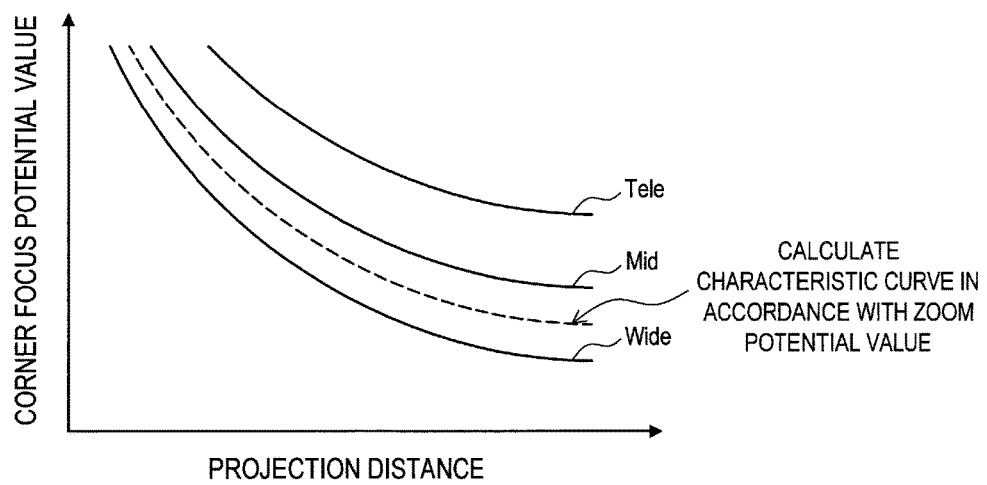

[Fig. 20]
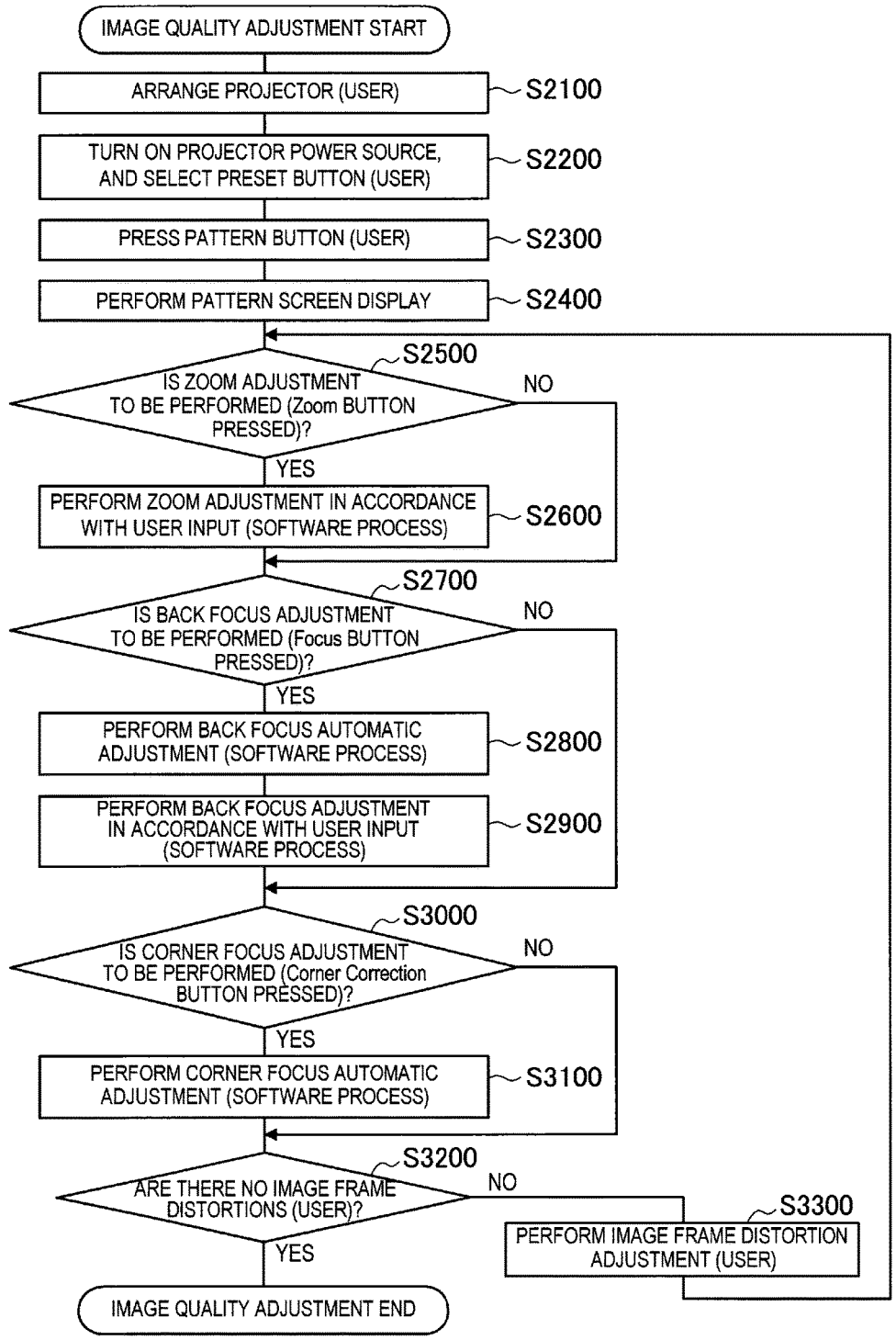

[Fig. 21]
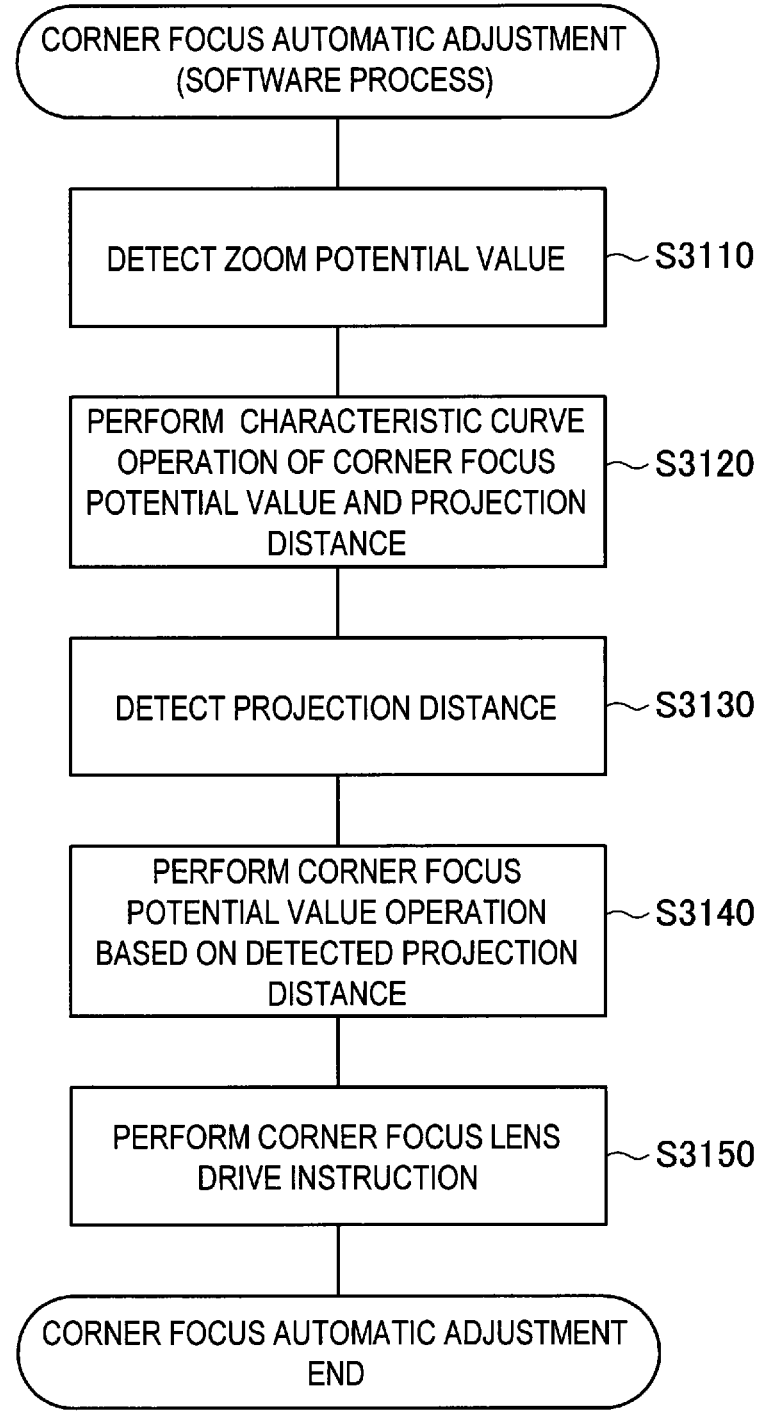

PROJECTION TYPE IMAGE DISPLAY DEVICE AND CONTROL METHOD OF PROJECTION TYPE IMAGE DISPLAY DEVICE

CROSS REFERENCE TO RELATED APPLICATIONS

This application claims the benefit of Japanese Priority Patent Application JP 2014-096327 filed May 7, 2014, the entire contents of which are incorporated herein by reference.

TECHNICAL FIELD

The present disclosure relates to a projection type image display device and a control method of a projection type image display device.

BACKGROUND ART

In recent years, projector devices have been widely known as projection type image display devices which display a projection image on a projection surface such as a screen. In particular, there has been a growing demand in recent years for front projection type projector devices with a very wide angle which can display an image of a large screen while reducing a projection space. A front projection type projector device with a very wide angle can set a focal distance of a projection image to a very close distance (hereinafter, such a projector device will be called a "short focus type projector device"). In the case where a short focus type projector device is used, an image of a large screen can be displayed in a limited space, by projecting an image inclined with respect to a projection surface and with a wide angle. Generally, a projector device is used by adjusting the quality of a projection image to an optimal state, at the time when performing installation, at the time when performing a change of screen size or the like.

CITATION LIST

Patent Literature

PTL 1: JP 2014-32402A

SUMMARY

Technical Problem

Incidentally, since a short focus type projector device has a large projection angle with respect to a projection surface and an image angle which becomes a very wide angle, it will not be easy for a user to adjust the focus of a projection image. In particular, even if the projection angle is large, and the focus of the central region of a projection image projected with a very wide angle is in focus, the focus of the outer region of the projection image being out of focus can occur.

Accordingly, the present disclosure proposes a new and improved projection type image display device and a control method of a projection type image display device capable of appropriately and automatically adjusting a focal distance of at least the corner regions of a projection image to a focal distance corresponding to a projection distance, in a short focus type projector device.

Solution to Problem

According to an embodiment of the present disclosure, there is provided a projection type image display device including a light source, an illumination optical system which uniformly radiates light flux emitted from the light source onto a surface of an image modulation element which becomes a primary image surface, a projection optical system, capable of being set at a distance very close to a focal distance of a projection image, which magnifies and projects image information of the primary image surface modulated by the image modulation element onto a projection surface which becomes a secondary image surface, and a corner focus control section capable of automatically adjusting a focal distance of at least corner regions of the projection image to a focal distance corresponding to a projection distance of the projection image.

According to another embodiment of the present disclosure, there is provided a control method of a projection type image display device, the method including automatically adjusting a focal distance of at least corner regions of a projection image, magnified and projected onto a distance very close to a projection surface, to a focal distance corresponding to a projection distance of the projection image.

Advantageous Effects of Invention

According to an embodiment of the present disclosure such as described above, it becomes possible to appropriately and automatically adjust a focal distance of at least the corner regions of a projection image to a focal distance corresponding to a projection distance, in a short focus type projector device.

Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 1 is an explanatory diagram which shows a schematic configuration example of a short focus type projector device according to a first embodiment of the present disclosure.

FIG. 2 is an explanatory diagram which shows a projection optical system of the short focus type projector device according to a same embodiment.

FIG. 3 is an explanatory diagram which shows a state of a zoom lens at the time of a zoom adjustment.

FIG. 4 is an explanatory diagram which shows a shift adjustment in accordance with a zoom adjustment.

FIG. 5 is an explanatory diagram which shows a configuration example of a display processing device according to a same embodiment.

FIG. 6 is a figure shown for describing a linear operation of a back focus potential value at the time of a back focus automatic adjustment.

FIG. 7 is a figure shown for describing an operation of a corner focus potential value at the time of a corner focus automatic adjustment.

FIG. 8 is a flow chart which shows the procedures for an image quality adjustment of the short focus type projector device according to a same embodiment.

FIG. 9 is a flow chart which shows an example of the procedures for an arrangement of the short focus type projector device by a user.

FIG. 10 is an explanatory diagram which shows a screen size and each distance, which are referred to at the time of an arrangement of the short focus type projector device.

FIG. 11 is an explanatory diagram which shows a screen size and an installation distance, which are referred to at the time of an arrangement of the short focus type projector device.

FIG. 12 is a flow chart which shows an example of a preset automatic adjustment process by the display processing device.

FIG. 13 is an explanatory diagram which shows an example of a pattern screen.

FIG. 14 is a flow chart which shows an example of a back focus automatic adjustment process by the display processing device.

FIG. 15 is a flow chart which shows an example of the procedures for an image frame distortion adjustment by a user.

FIG. 16 is an explanatory diagram which shows adjusters of a housing bottom surface.

FIG. 17 is an explanatory diagram which shows a schematic configuration example of the short focus type projector device according to a second embodiment of the present disclosure.

FIG. 18 is an explanatory diagram which shows a configuration example of the display processing device according to a same embodiment.

FIG. 19 is an explanatory diagram which shows a relationship between a projection distance, a magnification ratio of a projection image and a corner focus potential value.

FIG. 20 is a flow chart which shows an example of a corner focus automatic adjustment process by the display processing device.

FIG. 21 is a flow chart which shows the procedures for an image quality adjustment of the short focus type projector device according to a same embodiment.

DESCRIPTION OF EMBODIMENTS

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be given in the following order.
1. First embodiment
1.1. Outline of the projection type image display device
1.2. Schematic configuration example of the short focus type projector device
1.3. Configuration example of the projection optical system
1.4. Configuration example of the display processing device
1.4.1. Preset value setting section
1.4.2. Zoom control section
1.4.3. Back focus control section
1.4.4. Corner focus control section
1.5. Example of image quality adjustment procedures
2. Second embodiment
2.1. Schematic configuration example of the short focus type projector device
2.2. Configuration example of the display processing device
2.2.1. Zoom control section
2.2.2. Back focus control section
2.2.3. Corner focus control section
2.3. Example of image quality adjustment procedures
3. Summary <1. First Embodiment>
<1.1. Outline of the Projection Type Image Display Device>

First, an outline of a projection type image display device according to a first embodiment of the present disclosure will be simply described by including a short focus type projector device as an example.

A short focus type projector device is an example of a projection type image display device which can project an image inclined from an upper side or a lower side with respect to a projection surface and with a wide angle, and can display an image of a large screen on the projection surface. Since the focal distance of a projection image can be set to a very close distance, and the short focus type projector device can be installed at a very close distance from the projection surface, it becomes possible for the short focus type projector device to perform a display of a large screen with a limited space.

Here, the short focus type projector device is installed on the ceiling or the floor surface at a position near to the projection surface, so as not to obstruct a projection image from a viewer. In the case where a projection image inclined with respect to the projection surface and with a wide angle is projected, a difference in distance from the lens of the short focus type projector device will become large in accordance with a difference in the position on the screen. For example, in the case where the short focus type projector device is used by being placed on the floor surface, a distance from the lens will become significantly different at the lower and upper sides of the image frame. Accordingly, it will not be easy to optimally set the image quality, by having a user adjust the focal distance of the entire screen.

Further, at the time of performing a setting of the lens for an optical system of the short focus type projector device, the focal position when changing the magnification ratio of a projection image will be constant regardless of on the magnification side or the reduction side. On the other hand, at the time of manufacturing the lens, the sensitivity will be different with respect to a focal position on the magnification side or the reduction side of a screen size. Therefore, when actually using the short focus type projector device, there may the necessity to be able to adjust the focal position of the projection image to a same position on an optical axis. In addition, a change of a refractive index of the lens or a linear expansion of a configured product can occur due to a change of temperature or the like within the room in which the short focus type projector device is installed. In this case, since the position of the focus changes, a function may be necessary which corrects the focal distance of the projection image.

Also, in the short focus type projector device, the magnification ratio of the projection image and the focal distance of the central region and the surrounding region of the projection image are mutually related, and it will not be easy for all of them to be adjusted by a user himself or herself. From such a background, the short focus type projector device according to the present embodiment is constituted so to be able to easily execute an adjustment of the focal distance.

The short focus type projector device forms, for example, an optical image corresponding to image signals by modulating light emitted from a light source constituted from a light emitting element such as a laser diode (LD), a high-pressure mercury lamp or the like, with a liquid crystal display element, a digital micro mirror device (DMD) or the like which is an image modulation element. Further, the short focus type projector device is constituted so as to magnify and project this formed optical image by a projection optical system, and display the magnified and projected optical image on a projection surface. A so-called three-plate type, which includes panel-shaped display elements corresponding to each of the colors of red (R), green (G) and blue (B), is widely known as such a short focus type projector device.

Note that, the short focus type projector device described in the present disclosure can be set, for example, so that a projection optical system corresponds to a very wide angle such as approximately 70 degrees set to a half image angle.

<1.2. Schematic Configuration Example of the Short Focus Type Projector Device>

Next, a schematic configuration of the short focus type projector device according to the present embodiment will be described. FIG. 1 is an explanatory diagram which shows a schematic configuration example of a short focus type projector device 100 according to the present embodiment. As shown in FIG. 1, the short focus type projector device 100 includes a light source 40, an illumination optical system 30 and a projection optical system 10 within a housing 90. Further, the short focus type projector device 100 includes an operation panel 70, a display processing device 200, a storage section 60 and a driver circuit 50. A remote controller 80 for performing operations by a user is included additionally to such a short focus type projector device 100.

Such a short focus type projector device 100 is constituted by presupposing that the short focus type projector device 100 is installed, by a user, in accordance with a projection distance corresponding to a desired projection screen size. That is, a user can install the short focus type projector device 100, by referring to an operation manual or the like, so as to become a projection distance corresponding to a projection screen size.

The light source 40 is constituted from an LD, a high-pressure mercury lamp or the like, and emits light flux for to the illumination optical system 30.

The illumination optical system 30 uniformly radiates the light flux emitted from the light source 40 onto the surface of an image modulation element (liquid crystal panel) which becomes a primary image surface. Specifically, in the illumination optical system 30, the light flux from the light source 40 is transmitted through first and second fly-eye lens, a polarization conversion element and a condensing lens. The light flux transmitted through these is separated into each of the color components of RGB by a dichroic mirror which reflects only light of a specific wavelength band. Each of the color components of RGB are incident onto liquid crystal panels included corresponding to each of the colors of RGB, while using a total reflection mirror or lens or the like. Then, after optical modulation corresponding to image signals is performed on each of the liquid crystal panels, each of the optically modulated color components are combined by a dichroic prism, and the combined color components are emitted towards the projection optical system 10.

Note that, the liquid crystal panels may be either transmission type or reflective type liquid crystal panels. Further, other than a liquid crystal panel, a digital micro minor device (DMD) or the like can be used as an image modulation element. In addition, a color combining prism, which combines the image signals of a polarization beam splitter (PBS) or each of the RGB colors, a Total Internal Reflection (TIR) prism or the like can be used, instead of a dichroic prism.

The projection optical system 10 receives emitted light from the illumination optical system 30, and magnifies and projects image information of the primary image surface modulated by the liquid crystal panels of the illumination optical system 30 onto a projection surface SCR which becomes a secondary image surface. The projection optical system 10 includes a corner focus lens 12, a zoom lens 14, and a back focus lens 16.

<1.3. Configuration Example of the Projection Optical System>

Next, a configuration of the projection optical system 10 used for an adjustment of a magnification ratio and focus of a projection image will be specifically described.

FIG. 2 is an optical path diagram which shows a schematic configuration example of the projection optical system 10 according to the present embodiment. As shown in FIG. 2, the projection optical system 10 has a first optical system L1 having a positive refractive power, and a second optical system L2 with a concave refection surface. The first optical system L1 has a common optical axis in which all of the optical components constituting this first optical system L1 have a rotation target surface. Further, the second optical system L2 is constituted by a curved reflection surface, and has a common optical axis with the first optical system L1. By having such a first optical system L1 and second optical system L2, the projection optical system 10 is constituted so as to magnify and project from the primary image surface of the reduction side to the secondary image surface of the magnification side. That is, the projection optical system 10 magnifies and projects image information of the primary image surface formed by the illumination optical system 30 onto a projection surface SCR which becomes the secondary image surface.

In the projection optical system 10 with such a configuration, the first optical system L1 is constituted by having an optical system L11 with a positive refractive power and an optical system L12 with a negative refractive power arranged from the side of the primary image surface. Also, light flux emitted from this first optical system L1 is incident on this second optical system L2, after an intermediate image IM has been formed once with the second optical system L2.

Note that, while a first plane reflection surface is arranged at M1 shown within FIG. 2, this will be a dummy surface in this figure for the sake of convenience.

The optical system L12 within such a first optical system L1 has a function as a corner focus lens 12 for adjusting a focal distance of the corner regions of a projection image (hereinafter, called a "corner focus"). By having a part of the lens group of the optical system L12 move backwards and forwards along the optical axis, the focal distance of the corner regions for an image frame of a projection image can be adjusted. That is, it can be said that adjusting the focal distance of the corner regions of the projection image is adjusting the focal distance of an outer region of the projection image. The position of the corner focus lens 12 can be moved, for example, by a corner focus lens drive motor controlled by the display processing device 200. Further, the position of the corner focus lens 12 is capable of being detected, for example, by a corner focus potentiometer, which is not illustrated. The short focus type projector device 100 according to the present embodiment is installed on a floor surface and used, and the corner focus lens 12 mainly adjusts the focal distance of the corner regions on the upper side of the image frame.

Further, the optical system L11 within the first optical system L1 has a function as a zoom lens 14 for adjusting the magnification ratio of a projection image (hereinafter, called a "zoom"). By changing the interval of a lens group constituting the optical system L11, the magnification ratio of a projection image can be adjusted. Further, in the projection optical system 10 according to the present embodiment, the optical system L11 moves in a direction orthogonal to the optical axis, in accordance with the magnification ratio of a projection image, and the height position of the projection image is shift adjusted. The position of the zoom lens 14 can be moved, for example, by a zoom lens drive motor controlled by the display processing device 200. Further, the position of the zoom lens 14 is capable of being detected, for example, by a zoom potentiometer, which is not illustrated.

FIG. 3 and FIG. 4 are explanatory diagrams which show operations and functions of the zoom lens 14 of the projection optical system 10 according to the present embodiment. The upper stage of FIG. 3 shows an state of the projection optical system 10 at the time when the magnification ratio of a projection image is set to a maximum (Wide), and the lower stage of FIG. 3 shows a state of the projection optical system 10 at the time when the magnification ratio of a projection image is set to a minimum (Tele). When the magnification ratio of a projection image is compared between the Wide state and the Tele state, such as shown in FIG. 3, not only is the lens interval of the zoom lens 14 different, but the height position of the zoom lens 14 is also shifted. In this way, as shown in FIG. 4, the magnification ratio of a projection image in a Tele state can prevent the projection image from shifting downwards, and can display the projection image at an appropriate position.

Further, the optical system L11 is constituted by including a back focus lens 16 for adjusting the focal distance of the central region of a projection image (hereinafter, called a "back focus"). The back focus lens 16 is arranged on the illumination optical system 30 side from within the lens group of the optical system L11. By having the back focus lens 16 move backwards and forwards in the optical axis direction, a back focus of a projection image can be adjusted. The position of the back focus lens 16 can be moved, for example, by a back focus lens drive motor controlled by the display processing device 200. Further, the position of the back focus lens 16 is capable of being detected, for example, by a back focus potentiometer, which is not illustrated.

<1.4. Configuration Example of the Display Processing Device>

Next, a configuration example of the display processing device 200, which performs a control of the projection optical system 10, will be described. FIG. 5 is an explanatory diagram which shows a configuration of the display processing device 200 and the driver circuit 50 by functional blocks. The display processing device 200 according to the present embodiment has a back focus control section 200a, a corner focus control section 200b, a zoom control section 200c, and a preset value setting section 200d. Specifically, each of these control sections are functions implemented by the execution of programs by a microcomputer or the like. Operation signals of the remote controller 80 and the operation panel 70, and detection signals of the back focus potentiometer, the corner focus potentiometer and the zoom potentiometer, are input to the display processing device 200. Further, the driver circuit 50 has a back focus lens drive circuit 50a, a corner focus lens drive circuit 50b, and a zoom lens drive circuit 50c.

Further, as shown in FIG. 1, three preset buttons Custom 1, Custom 2 and Custom 3 are included, as a "Picture Position", in the remote controller 80 for operating the display processing device 200 according to the present embodiment. The number of preset buttons may be one or two, or may be four or more. The position of the corner focus lens 12, the position of the zoom lens 14 and the position of the back focus lens 16 are mutually associated with the three preset buttons Custom 1, Custom 2 and Custom 3, and are stored in the storage section 60 in advance. Further, each of the lens positions can be represented as potential values of the potentiometers.

In the present embodiment, initial settings are made for the preset button Custom 1 to be used for a large screen, the preset button Custom 2 to be used for a medium screen, and the preset button Custom 3 to be used for a small screen. Therefore, the back focus control section 200a, the corner focus control section 200b and the zoom control section 200c respectively read corresponding preset values from a stored preset value group, by having a user select a preset button corresponding to a desired projection screen size.

At this time, an initial setting value of the preset value group becomes a value in which it is assumed that the short focus type projector device 100 has been installed by a user, so that the projection distance becomes a projection distance corresponding to a desired projection screen size. The "projection distance" has the meaning of a distance from the short focus type projector device 100 up to the projection surface, and can be defined as a straight line distance from an arbitrary position of the short focus type projector device 100 up to the projection surface. For example, it may be a distance from a specified position on the surface of the projection surface side of the short focus type projector device 100 up to the projection surface, or may be a distance from the position of the lens projecting a projection image up to the projection surface.

Further, three image quality adjustment buttons Zoom, Focus and Corner Correction are included, as a "Lens Adjustment", in the remote controller 80. In addition, an arrow button and an image quality adjustment pattern display button Pattern are included in the remote controller 80. The functions of these operation buttons included in the remote controller 80 are also capable of being selected by the operation panel 70.

(1.4.1. Preset Value Setting Section)

The preset value setting section 200d has a function for storing a preset value group, which is constituted from a combination of the position of the zoom lens 14, the position of the back focus lens 16 and the position of the corner focus lens 12, in the storage section 60. For example, the preset value setting section 200d causes a combination of a suitable position of the zoom lens 14, a suitable position of the back focus lens 16 and a suitable position of the corner focus lens 12 to be stored in the storage section 60, in accordance with an operation of the remote controller 80, the operation panel 70 or the like by a user.

A user operates the remote controller 80 or the operation panel 70, in a state where adjustments of the magnification ratio of the projection image, the back focus and the corner focus have finished, and can cause the preset value group at this time to be stored in the storage section 60. Alternatively, the preset value setting section 200d may automatically recognize a combination of the position of the zoom lens 14, the position of the back focus lens 16 and the position of the corner focus lens 12 with a high usage frequency, and may cause this combination to be stored in the storage section 60. If a desired preset value group is able to be stored in the storage section 60, an adjustment of the image quality can be easily performed, when performing an image display of a screen size with a high usage frequency.

At this time, the preset value setting section 200*d* can be constituted so that an initial setting value of a preset value group called by a preset button, which is stored in the storage section 60 in advance, can be overwritten and saved in a new preset value group. Alternatively, the preset value setting section 200*d* may cause the preset value group to be stored in the storage section 60, by being able to perform calling by an operation different to a preset button.

(1.4.2. Zoom Control Section)

The zoom control section 200*c* outputs a drive instruction of the zoom lens drive motor for the zoom lens drive circuit 50*c*. In the display processing device 200 according to the present embodiment, the zoom control section 200*c* is capable of automatically adjusting the magnification ratio of a projection image in accordance with a preset value linked to a preset button selected by a user, from among a plurality of preset buttons set in advance. Further, the zoom control section 200*c* is capable of adjusting the magnification ratio of a projection image in accordance with an operation of a user.

A user can adjust the magnification ratio of a projection image, by operating the remote controller 80 or the operation panel 70. For example, in the case where the magnification ratio of a projection image is automatically adjusted by a preset value, the user selects a preset button of the remote controller 80 or the operation panel 70, in accordance with a desired projection screen size. In this way, the zoom control section 200*c* reads a preset value linked to the selected preset button, and outputs a drive instruction for moving the zoom lens 14 to a corresponding position to the zoom lens drive circuit 50*c*. In the short focus type projector device 100 according to the present embodiment, the initial values for the preset values of the magnification ratio of a projection screen linked to the three preset buttons are all set to a maximum value of a magnification side (Wide).

Further, when the user selects a Zoom button by the remote controller 80 or the operation panel 70, it becomes possible to perform an adjustment of the magnification ratio of a projection image by an input operation of the user. In this case, by having the user operate the arrow button of the remote controller 80 or the operation panel 70, the zoom control section 200*c* outputs a drive instruction for the zoom lens drive circuit 50*c*, in accordance with this input.

In this way, an automatic adjustment of the magnification ratio of a projection image is executed, for the short focus type projector device 100 according to the present embodiment, by pressing a preset button. Further, the short focus type projector device 100 according to the present embodiment is also capable of performing an adjustment of the magnification ratio by an input operation of a user. Therefore, the screen size of a projection image can be adjusted with comparative ease.

(1.4.3. Back Focus Control Section)

The back focus control section 200*a* outputs a drive instruction of the back focus lens drive motor for the back focus lens drive circuit 50*a*. In the display processing device 200 according to the present embodiment, the back focus control section 200*a* is capable of automatically adjusting the back focus in accordance with a selection of a user, from among a plurality of preset values set in advance. Further, the back focus control section 200*a* is capable of automatically adjusting the back focus, based on the magnification ratio of the present projection image. In addition, the back focus control section 200*a* is capable of adjusting the back focus in accordance with an operation of a user.

A user can adjust the back focus, by operating the remote controller 80 or the operation panel 70. For example, in the case where the back focus is automatically adjusted by a preset value, the user selects a preset button of the remote controller 80 or the operation panel 70, in accordance with a desired projection screen size. In this way, similar to the automatic adjustment of the magnification ratio of a projection image, an automatic adjustment of the back focus is performed based on a preset value.

Specifically, the back focus control section 200*a* reads a preset value linked to the selected preset button, and outputs a drive instruction for moving the back focus lens 16 to a corresponding position to the back focus lens drive circuit 50*a*. In the short focus type projector device 100 according to the present embodiment, initial values for the preset values of the back focus are set to values appropriate for the three projection screen sizes which become standards, by assuming that the magnification ratios of the projection image are all set to the magnification side (Wide).

Further, when the user selects a Focus button by the remote controller 80 or the operation panel 70, the back focus control section 200*a* reads a zoom potential value which shows the present position of the zoom lens 14. Further, the back focus control section 200*a* calculates a back focus potential value which represents a position of the back focus lens 16 corresponding to the position of the zoom lens 14. Then, the back focus control section 200*a* outputs a drive instruction for moving the back focus lens 16 to the calculated position to the back focus lens drive circuit 50*a*.

FIG. 6 is an explanatory diagram which shows an example of a method for obtaining a position of the back focus lens 16 in accordance with a position of the zoom lens 14, in the display processing device 200 according to the present embodiment. In the present embodiment, optimal values B_wide, B_mid and B_tele of the back focus potential values, which correspond to zoom potential values of the standard magnification ratios Z_wide, Z_mid and Z_tele of three points of a projection image, are stored in the storage section 60 in advance. If the read present zoom potential value is between the two standard positions Z_tele and Z_mid, the back focus control section 200*a* calculates a corresponding back focus potential value by a linear operation (a). The back focus control section 200*a* calculates a back focus potential value (y1) corresponding to a detected zoom potential value (x1), by the following Equation (1), in the region of the linear operation (a).

[Math. 1]

$$y1 = \frac{B\_tele - B\_mid}{Z\_tele - Z\_mid} x1 + \frac{B\_mid * Z\_tele - B\_tele * Z\_mid}{Z\_tele - Z\_mid} \quad \text{Equation (1)}$$

Further, if the read present zoom potential value is between the two standard positions Z_mid and Z_wide, the back focus control section 200*a* calculates a corresponding back focus potential value by a linear operation (b). The back focus control section 200*a* calculates a back focus potential value (y2) corresponding to a detected zoom potential value (x2), by the following Equation (2), in the region of the linear operation (b).

[Math. 2]

$$y2 = \frac{B\_mid - B\_wide}{Z\_mid - Z\_wide}x2 + \frac{B\_wide * Z\_mid - B\_mid * Z\_wide}{Z\_mid - Z\_wide}$$

Equation (2)

Note that, while linear operations are performed in the present embodiment based on back focus potential values corresponding to the zoom potential values of the standard magnification ratios of three points, it may be set to two points or to four or more points.

In the display processing device 200 of the present embodiment, when a user selects the Focus button, and the automatic adjustment of the position of the back focus lens 16 based on the present position of the zoom lens 14 ends, an adjustment of the back focus is opened by an input operation of the user. Therefore, by having the user operate the arrow button of the remote controller 80 or the operation panel 70, after the automatic adjustment of the back focus, the back focus control section 200a outputs a drive instruction for the back focus lens drive circuit 50a, in accordance with this input.

In this way, an automatic adjustment of the back focus is executed, for the short focus type projector device 100 according to the present embodiment, by pressing a preset button and the Focus button, or pressing the Focus button. Further, the short focus type projector device 100 according to the present embodiment is capable of performing an adjustment of the back focus by an input operation of a user. Therefore, the back focus of a projection image can be adjusted with comparative ease. As a result of this, the image quality of a projection image can be easily set to an optimal state. Such an adjustment of the back focus may be executed in a state for displaying a pattern screen displayed by pressing the image quality adjustment pattern display button Pattern.

(1.4.4. Corner Focus Control Section)

The corner focus control section 200b outputs a drive instruction of the corner focus lens drive motor for the corner focus lens drive circuit 50b. In the display processing device 200 according to the present embodiment, the corner focus control section 200b is capable of automatically adjusting the corner focus in accordance with a preset value linked to a preset button selected by a user, from among the plurality of preset buttons included in the remote controller 80 or the like.

In the short focus type projector device 100 according to the present embodiment, a relational expression representing a correlation between the magnification ratio of a projection image of the projection optical system 10, the projection distance and the position of the corner focus lens 12 is obtained in advance. The projection distance corresponds to the projection screen size. The corner focus control section 200b performs an automatic adjustment of the corner focus so that the position of the corner focus lens 12 becomes a position corresponding to a prescribed magnification ratio and projection distance of the projection image.

FIG. 7 shows a characteristic diagram which represents a relationship between the magnification ratio of the projection screen, the projection distance of a projection image and the corner focus potential value. When the projection distance is set to x3 and the corner focus potential value is set to y3, the characteristic curves shown in FIG. 7 can be represented by the following Equation (3).

[Math. 3]

$$y3 = ax3^2 + bx3 + c\_zoom \quad (3)$$

Equation (3)

That is, the corner focus potential value (y3) is represented by a quadratic equation of the projection distance (x3). Such a characteristic equation can be obtained based on the values measured for each of the magnification ratios of the projection image which become standards, by using the lens to be used. According to such a characteristic equation, if the lens to be used or the like is determined, the second order and first order coefficients a and b of the projection distance (x3) will become common values regardless of the magnification ratio, and the value of the constant term c_zoom will be different in accordance with the magnification ratio. In the present embodiment, characteristic curves for the three points of the state of the magnification side (Wide), the reduction side (Tele) and the middle (Mid) of a projection image are obtained in advance and stored in the storage section 60. Further, the initial setting values of the preset values of the corner focus linked to each of the preset buttons are determined (C_custom1, C_custom2, C_custom3 of FIG. 7) based on the projection distances corresponding to the projection screen sizes, which correspond to each of the preset buttons, by using the characteristic curve of the magnification side (Wide) which is a preset value of the magnification ratio of the projection screen.

In the case where the corner focus is automatically adjusted by a preset value, a user selects a preset button of the remote controller 80 or the operation panel 70, in accordance with a desired projection screen size. In this way, similar to the automatic adjustment of the magnification ratio or the back focus of a projection image, an automatic adjustment of the corner focus is performed based on a preset value. Specifically, the corner focus control section 200b reads a preset value linked to a selected preset button, and outputs a drive instruction for moving the corner focus lens 12 to a corresponding position to the corner focus lens drive circuit 50b.

Further, in the display processing device 200 according to the present embodiment, when a user selects the Corner Correction button by the remote controller 80 or the operation panel 70, it becomes possible to perform an adjustment of the corner focus by an input operation of the user. In this case, by having the user operate the arrow button of the remote controller 80 or the operation panel 70, the corner focus control section 200b outputs a drive instruction for the corner focus lens drive circuit 50b, in accordance with this input.

In this way, it becomes possible to execute an automatic adjustment of the corner focus, for the short focus type projector device 100 according to the present embodiment, by pressing a preset button. Further, it also becomes possible to perform an adjustment of the corner focus, for the short focus type projector device 100 according to the present embodiment, by an input operation of a user. Therefore, the corner focus of a projection image can be adjusted with comparative ease. As a result of this, the image quality of a projection image can be easily set to an optimal state. Such an adjustment of the corner focus may be executed in a state for displaying a pattern screen displayed by pressing the image quality adjustment pattern display button Pattern.

<1.5. Example of Image Quality Adjustment Procedures>

Next, an example of the procedures for an image quality adjustment of the short focus type projector device 100 will be described. FIG. 8 is a flow chart which shows an example of image quality adjustment procedures for the short focus type projector device 100 according to the present embodiment. The image quality adjustment procedures which will be described hereinafter are an example of the procedures performed at the time of performing an installation of the short focus type projector device 100.

First, in step S100, a user arranges the short focus type projector device 100 at a prescribed position. An example of an arrangement procedure of the short focus type projector device 100 is shown in FIG. 9. When the short focus type projector device 100 is to be arranged, first, in step S110, the user determines a projection screen size in accordance with the size of the projection surface SCR or the like. Next, in step S120, the user determines an installation distance of the short focus type projector device 100 with respect to the projection surface SCR, in accordance with the projection screen size. At this time, the user may determine the installation distance, by referring to information of an installation distance of the short focus type projector device 100 suitable for the projection screen size, which is illustrated in FIG. 10 and FIG. 11. Next, in step S130, the user arranges the short focus type projector device 100 in accordance with the installation distance. In this way, the arrangement of the short focus type projector device 100 is completed.

Returning to FIG. 8, when the arrangement of the short focus type projector device 100 is completed, next, in step S200, the user turns on the power source of the short focus type projector device 100, and thereafter selects a preset button Custom 1, Custom 2 or Custom 3 corresponding to the projection screen size. The user is capable of referring to the projection screen sizes corresponding to each of the preset buttons Custom 1, Custom 2 and Custom 3, in an instruction manual or the like.

Next, in step S300, the display processing device 200 executes a preset automatic adjustment of the zoom, the back focus and the corner focus, in accordance with the selected preset button Custom 1, Custom 2 or Custom 3. FIG. 12 is a flow chart which shows an example of a preset automatic adjustment. When a preset automatic adjustment is to be executed, first, in step S310, the display processing device 200 reads a zoom potential value, a back focus potential value and a corner focus potential value linked to a selected preset button. Next, in step S320 to step S340, the display processing device 200 outputs drive instructions, so as to move the position of each lens to the potential values read in step S310, for the zoom lens drive circuit 50c, the back focus lens drive circuit 50a and the corner focus lens drive circuit 50b. In this way, the preset automatic adjustment is completed.

Returning to FIG. 8, after the preset automatic adjustment has been executed, in step S400, the user presses the image quality adjustment pattern display button Pattern, and in step S500, the display processing device 200 projects a pattern screen onto the projection surface SCR. An example of a pattern screen is shown in FIG. 13. Since an adjustment of the back focus and the corner focus is performed at the time of performing an image quality adjustment, the pattern screen will have cross patterns in the central and corner regions of the screen. A focus adjustment is performed, so as to focus these cross patterns, at the time of performing the processes of each focus adjustment.

Next, in step S600, the user determines whether or not to perform an adjustment of the magnification ratio of the projection image. If the user does not press the Zoom button (S600: No), it returns to step S800 as it is. On the other hand, in the case where the Zoom button is pressed by the user (S600: Yes), in step S700, the display processing device 200 outputs a drive instruction to the zoom lens drive circuit 50c in accordance with an operation of the arrow button by the user, and moves the position of the zoom lens 14. When the adjustment of the magnification ratio of the projection image ends, the user presses the select button.

Next, in step S800, the user determines whether or not to perform an adjustment of the back focus of the projection image. If the user does not press the Focus button (S800: No), it proceeds to step S1100 as it is. On the other hand, in the case where the Focus button is pressed by the user (S800: Yes), in step S900, the display processing device 200 executes an automatic adjustment process of the back focus.

FIG. 14 is a flow chart which shows a process example of an automatic adjustment of the back focus. When an automatic adjustment of the back focus is to be executed, first, in step S910, the display processing device 200 determines whether or not the position of the zoom lens 14 has changed. In the case where the short focus type projector device 100 is installed for the first time, the display processing device 200 determines that the position of the zoom lens 14 has changed. In the case where the position of the zoom lens 14 has changed (S910: Yes), in step S920, the display processing device 200 detects the present zoom potential value. Next, in step S930, the display processing device 200 performs a linear operation for the back focus potential value, based on the detected zoom potential value, by using a relationship between the zoom potential value and the back focus potential value such as that shown in FIG. 6.

Next, in step S940, the display processing device 200 outputs a drive instruction to the back focus lens drive circuit 50a, so as to move the back focus lens 16 to the position of the calculated back focus potential value. After the drive instruction has been output to the back focus lens drive circuit 50a, in step S950, the display processing device 200 opens the back focus adjustment by the user. On the other hand, in step S910, in the case where the position of the zoom lens 14 has not changed (S910: No), it proceeds to step S950 as it is, and the display processing device 200 opens the back focus adjustment by the user. In this way, the back focus automatic adjustment process is completed.

After the end of the automatic adjustment process of the back focus, in step S1000, the user operates the arrow button as necessary, and further adjusts the back focus. At this time, the display processing device 200 outputs a drive instruction to the back focus lens drive circuit 50a in accordance with an operation of the arrow button by the user, and moves the position of the back focus lens 16. When the adjustment of the back focus ends, the user presses the select button.

Next, in step S1100, the user determines whether or not to perform an adjustment of the corner focus of the projection image. If the user does not press the Corner Correction button (S1100: No), it proceeds to step S1300 as it is. On the other hand, in the case where the Corner Correction button is pressed by the user (S1100: Yes), in step S1200, the display processing device 200 outputs a drive instruction to the corner focus lens drive circuit 50b in accordance with an operation of the arrow button by the user, and moves the position of the corner focus lens 12. When the adjustment of the corner focus ends, the user presses the select button.

Next, in step S1300, the user determines whether the image frame of the projection image projected onto the projection surface SCR is not distorted. In the case where it is determined that there are distortions in the image frame (S1300: No), it proceeds to step S1400, and the user performs a distortion adjustment of the image frame by physically changing the arrangement state of the short focus type projector device 100.

FIG. 15 is a flow chart which shows a distortion adjustment of the image frame by a user. When a distortion adjustment is to be executed, first, in step S1410, the user determines whether or not the upper side and the lower side of the image frame are parallel. In the case where the upper side and the lower side of the image frame are parallel (S1410: Yes), it proceeds to step S1430 as it is. On the other hand, in the case where the upper side and the lower side of the image frame are not parallel (S1410: No), in step S1420, the user adjusts the inclination of the short focus type projector device 100 with respect to the projection surface SCR. That is, as shown in FIG. 16, the user adjusts the distance between the right side or the left side end of the housing 90 and the projection surface SCR, and makes the upper side and the lower side of the image frame parallel.

Next, in step S1430, the user determines whether or not the lower side of the image frame is horizontal. In the case where the lower side of the image frame is horizontal (S1430: Yes), it proceeds to step S1450 as it is. On the other hand, in the case where the lower side of the image frame is not horizontal (S1430: No), in step S1440, the user adjusts the left and right inclination of the short focus type projector device 100 with respect to the horizontal surface. That is, as shown in FIG. 16, the user arbitrarily adjusts the height of left and right adjusters 95a, 95b, 95e and 95f, from among adjusters 95a to 95f included on the bottom surface of the housing 90, and makes the lower side of the image frame horizontal.

Next, in step S1450, the user determines whether or not the left and right sides of the image frame are vertical. In the case where the left and right sides of the image frame are vertical (S1450: Yes), the distortion adjustment of the image frame ends. On the other hand, in the case where the left and right sides of the image frame are not vertical (S1450: No), in step S1460, the user adjusts the forwards and backwards inclination of the short focus type projector device 100 with respect to the horizontal surface. That is, as shown in FIG. 16, the user arbitrarily adjusts the height of the adjusters (flap adjusters) 95b, 95d and 95f of the near side (the opposite side to the projection surface side), from among the adjusters 95a to 95f included on the bottom surface of the housing 90, and makes the left and right sides of the image frame vertical. In this way, the distortion adjustment of the image frame is completed.

Returning to FIG. 8, since there is the possibility that the projection screen size or the focal distance of the projection image has shifted, after the distortion adjustment of the image frame of step S1400 has ended, it returns to step S600, and the operations or processes of each of the steps are repeated in accordance with the above described flow. Finally, in step S1300, in the case where the focus of the projection image is in an appropriate state, and the user has determined that there are no distortions of the image frame (S1300: Yes), the image quality adjustment ends.

As described above, according to the short focus type projector device 100 according to the present embodiment, the corner focus and the back focus are automatically adjusted. Therefore, a focus adjustment of a projection image can be performed with comparative ease, even if it is a short focus type projector device in which focus adjustment by a user is comparatively difficult.

Further, according to the short focus type projector device 100 according to the present embodiment, a user can adjust the corner focus and the back focus of the projection screen, by operating the remote controller 80 or the operation panel 70. Therefore, a focus adjustment of a projection image can be performed for the entire screen in accordance with an operation of the user. As a result of this, an adjustment of the magnification ratio of the projection image can be performed by the user. Accordingly, the short focus type projector device 100 according to the present embodiment can project a projection image of a screen size desired by a user with a high image quality.

Note that, in the case where a zoom adjustment, a back focus adjustment and a corner focus adjustment are performed in accordance with operations of a user, it becomes easy to perform a good overall balance by executing in this sequence. Therefore, the sequence of a zoom adjustment, a back focus adjustment and a corner focus adjustment may be shown in an operation manual or the like, and may it may be suggested that a user perform an image quality adjustment in this sequence. Further, for an adjustment of distortions of the image frame, since distortions will be easily removed by executing with the procedures described in FIG. 15, the procedures of a distortion adjustment may be shown in an operation manual or the like, and it may be suggested that a user perform an image quality adjustment in this sequence.

<2. Second Embodiment>

Next, the projection type image display device according to a second embodiment of the present disclosure will be described. The projection type image display device according to the present embodiment has a configuration basically the same as the short focus type projector device according to the first embodiment. However, the short focus type projector device according to the present embodiment includes a projection distance sensor which detects a projection distance, and is constituted to be capable of executing an automatic adjustment of the corner focus, based on the projection distance detected by this projection distance sensor.

<2.1. Schematic Configuration Example of the Projection Type Image Display Device>

FIG. 17 is an explanatory diagram which shows a schematic configuration example of a short focus type projector device 300 according to the present embodiment. A housing 90, a light source 40, an illumination optical system 30, a projection optical system 10, an operation panel 70 and a storage section 60 can be constituted the same as those of the short focus type projector device 100 according to the first embodiment. Further, a remote controller 80 for performing operations by a user is included additionally to the short focus type projector device 300.

On the other hand, the short focus type projector device 300 according to the present embodiment includes a projection distance sensor 95 which detects a projection distance of a projection image. The short focus type projector device 300 according to the present embodiment does not have a preset automatic adjustment function. Instead of this, the short focus type projector device 300 has an automatic adjustment function of the focus based on a projection distance detected by the projection distance sensor 95. The projection distance sensor 95 is an example of a projection distance detection section, and is a sensor for detecting a prescribed projection distance defined as a distance from the short focus type projector device 300 up to the projection surface. For example, a well-known distance sensor, such as an infrared type distance sensor, a laser distance sensor or an ultrasonic wave type distance sensor, can be used.

<2.2. Configuration Example of the Display Processing Device>

Next, a configuration example of a display processing device 400 according to the present embodiment, which performs a control of the projection optical system 10, will be described. FIG. 18 is an explanatory diagram which shows a configuration of the display processing device 400 and the driver circuit 50 by functional blocks. The display processing device 400 according to the present embodiment has a back focus control section 400a, a corner focus control section 400b, a zoom control section 400c, and a focus automatic adjustment section 400d. Specifically, each of these control sections are functions implemented by the execution of programs by a microcomputer or the like.

Operation signals of the remote controller 80 and the operation panel 70, and detection signals of the back focus potentiometer, the corner focus potentiometer and the zoom potentiometer, are input to the display processing device 400. Further, sensor signals of the projection distance sensor 95 are input to the display processing device 400. In addition, the driver circuit 50 has a back focus lens drive circuit 50a, a corner focus lens drive circuit 50b, and a zoom lens drive circuit 50c.

(2.2.1. Zoom Control Section)

The zoom control section 400c outputs a drive instruction of the zoom lens drive motor for the zoom lens drive circuit 50c. In the display processing device 400 according to the present embodiment, the zoom control section 400c is capable of adjusting the magnification ratio of a projection image in accordance with an operation by a user. Apart from the point of not having a preset automatic adjustment function of the magnification ratio of a projection image, the zoom control section 400c can be constituted the same as the zoom control section 200c of the display processing device 200 according to the first embodiment.

(2.2.2. Back Focus Control Section)

The back focus control section 400a outputs a drive instruction of the back focus lens drive motor for the back focus lens drive circuit 50a. In the display processing device 400 according to the present embodiment, the back focus control section 400a is capable of automatically adjusting the back focus, based on the magnification ratio of the present projection image. Further, the back focus control section 400a is capable of adjusting the back focus in accordance with an operation of a user. Apart from the point of not having a preset automatic adjustment function of the back focus, the back focus control section 400a can be constituted the same as the back focus control section 200a of the display processing device 200 according to the first embodiment.

An automatic adjustment of the back focus is executed, for the short focus type projector device 300 according to the present embodiment, by pressing the Focus button. Further, the short focus type projector device 300 according to the present embodiment is also capable of performing an adjustment of the back focus by an input operation of a user. Therefore, the back focus of a projection image can be adjusted with comparative ease. As a result of this, the image quality of a projection image can be easily set to an optimal state. Such an adjustment of the back focus may be executed in a state for displaying a pattern screen displayed by pressing the image quality adjustment pattern display button Pattern.

Note that, in the present embodiment, while the automatic adjustment process of the back focus is executed by having a user press the Focus button, it is not limited to this. For example, at the time when the zoom value has changed, the display processing device 400 may automatically adjust the back focus in accordance with a zoom potential value, and not in accordance with an operation of a user.

(2.2.3. Corner Focus Control Section)

The corner focus control section 400b outputs a drive instruction of the corner focus lens drive motor for the corner focus lens drive circuit 50b. In the display processing device 400 according to the present embodiment, the corner focus control section 400b is capable of automatically adjusting the corner focus based on projection distance information detected by the projection distance sensor 95.

In the short focus type projector device 300 according to the present embodiment, a relational expression representing a correlation between the magnification ratio of a projection image, the projection distance of the projection image and the corner focus potential value, which is represented by the above described Equation (3), is obtained in advance. In the present embodiment, as shown by the solid lines of FIG. 19, standard characteristic curves for the three points of the state of the magnification side (Wide), the reduction side (Tele) and the middle (Mid) of a projection image are obtained in advance and stored in the storage section 60.

In the case where the corner focus is automatically adjusted by projection distance information detected by the projection distance sensor 95 and the magnification ratio of the present projection image, a user selects a Corner Collection button of the remote controller 80 or the operation panel 70. The corner focus control section 400b reads the projection distance information input from the projection distance sensor 95 and the present zoom potential value, and outputs a drive instruction for moving the corner focus lens 12 to a suitable lens position to the corner focus lens drive circuit 50b.

Specifically, when the present zoom potential value is read, the corner focus control section 400b calculates a characteristic curve corresponding to the present zoom potential value, based on the standard characteristic curves stored in the storage section 60, such as shown in FIG. 19. As already described in the first embodiment, the second order and first order coefficients a and b of the projection distance (x3) in Equation (3) are invariant values for the short focus type projector device 300, while on the other hand, the constant term c_zoom will change in accordance with the magnification ratio of the projection image.

Therefore, the corner focus control section 400b interpolates and calculates the constant term c_zoom corresponding to the present zoom potential value, based on the constant term c_zoom of the standard characteristic curves corresponding to the three points of the magnification ratios Wide, Mid and Tele. In this way, as shown by the dotted line in FIG. 19, a characteristic curve is calculated, which shows a relationship between the projection distance and the corner focus potential value, corresponding to the magnification ratio of the present projection image. The corner focus control section 400b obtains a corner focus potential value corresponding to the detected projection distance, by using such a characteristic curve, and outputs a drive instruction for the corner focus lens drive circuit 50b.

In this way, it becomes possible for an automatic adjustment of the corner focus to be executed, for the short focus type projector device 300 according to the present embodiment, based on projection distance information detected by the projection distance sensor 95. Therefore, the corner focus is automatically adjusted in accordance with an installation state of the short focus type projector device 300. Further, the short focus type projector device 300 according to the present embodiment executes an automatic adjustment of the corner focus by referring to the magnification ratio of the projection image together with the projection distance information. Therefore, the image quality of a projection image can be set to an optimal state, in accordance with the installation state of the short focus type projector device 300 and the magnification ratio of the projection image.

Note that, while an automatic adjustment process of the corner focus is executed, in the short focus type projector device 300 according to the present embodiment, by having a user press the Focus button, it is not limited to this. For example, the projection distance is usually detected by the projection distance sensor 95, and in the case where the zoom potential value has changed or in the case where the projection distance has changed, the display processing device 400 may automatically adjust the corner focus in accordance with the projection distance and the zoom potential value, and not in accordance with an operation of a user.

Further, since the short focus type projector device 300 according to the present embodiment has a zoom adjustment function, while not only projection distance information but also a zoom potential value is referred to at the time of performing an automatic adjustment of the corner focus, it is not limited to this. If it is a short focus type projector device which does not have a zoom adjustment function, the characteristic curves stored in advance become one, and the corner focus potential value can be obtained based on only projection distance information.

<2.3. Example of Image Quality Adjustment Procedures>

Next, an example of the procedures for an image quality adjustment of the short focus type projector device 300 will be described. FIG. 20 is a flow chart which shows an example of image quality adjustment procedures for the short focus type projector device 300 according to the present embodiment. The image quality adjustment procedures which will be described hereinafter are an example of the procedures performed at the time of performing an installation of the short focus type projector device 300.

First, in step S2100, a user arranges the short focus type projector device 300 at a prescribed position. In the present embodiment, the arrangement procedure of the short focus type projector device 300 can be performed in accordance with the flow chart shown in FIG. 9.

When the arrangement of the short focus type projector device 300 is completed, next, in step S2200, the user turns on the power source of the short focus type projector device 300, and thereafter in step S2300, presses the image quality adjustment pattern display button Pattern. In accordance with this, in step S2400, the display processing device 200 projects a pattern screen onto the projection surface SCR. The pattern screen can be set to the pattern screen shown in FIG. 13. However, since the corner focus is automatically adjusted in the present embodiment, patterns Pattern_Ca to Pattern Cd for corner focus adjustment may be omitted.

Next, in step S2500, the user determines whether or not to perform an adjustment of the magnification ratio of the projection image. If the user does not press the Zoom button (S2500: No), it proceeds to step S2700 at it is. On the other hand, in the case where the Zoom button is pressed by the user (S2500: Yes), in step S2600, the display processing device 400 outputs a drive instruction to the zoom lens drive circuit 50c in accordance with an operation of the arrow button by the user, and moves the position of the zoom lens 14. When the adjustment of the magnification ratio of the projection image ends, the user presses the select button.

Next, in step S2700, the user determines whether or not to perform an adjustment of the back focus of the projection image. If the user does not press the Focus button (S2700: No), it proceeds to step S3000 as it is. On the other hand, in the case where the Focus button is pressed by the user (S2700: Yes), in step S2800, the display processing device 400 executes an automatic adjustment process of the back focus. The automatic adjustment process of the back focus can be executed in accordance with the flow chart shown in FIG. 14.

After the end of the automatic adjustment process of the back focus, in step S2900, the user operates the arrow button as necessary, and further adjusts the back focus. At this time, the display processing device 400 outputs a drive instruction to the back focus lens drive circuit 50a in accordance with an operation of the arrow button by the user, and moves the position of the back focus lens 16. When the adjustment of the back focus ends, the user presses the select button.

Next, in step S3000, the user determines whether or not to perform an adjustment of the corner focus of the projection image. If the user does not press the Corner Correction button (S3000: No), it proceeds to step S3200 as it is. On the other hand, in the case where the Corner Correction button is pressed by the user (S3000: Yes), in step S3100, the display processing device 400 executes an automatic adjustment of the corner focus based on projection distance information detected by the projection distance sensor 95.

FIG. 21 is a flow chart which shows a process example of an automatic adjustment of the corner focus. When an automatic adjustment of the corner focus is to be executed, first, in step S3110, the display processing device 400 detects the present zoom potential value. Next, in step S3120, the display processing device 400 calculates a characteristic curve corresponding to the present zoom potential value by an interpolation calculation, which is a characteristic curve showing a relationship between the projection distance and the corner focus potential value, such as shown in FIG. 19.

Next, in step S3130, the display processing device 400 reads the projection distance information detected by the projection distance sensor 95. Next, in step S3140, the display processing device 400 obtains a corner focus potential value corresponding to the present projection distance by an operation, based on the characteristic curve obtained by step S3120. Next, in step S3150, the display processing device 400 outputs a drive instruction to the corner focus lens drive circuit 50b, so as to move the corner focus lens 12 to the position of the calculated corner focus potential value. In this way, the corner focus automatic adjustment process is completed. When the automatic adjustment of the corner focus ends, the user presses the select button.

Returning to FIG. 20, after the end of the automatic adjustment of the corner focus, next, in step S3200, the user determines whether the image frame of the projection image projected onto the projection surface SCR is not distorted. In the case where it is determined that there are distortions in the image frame (S3200: No), it proceeds to step S3300, and the user performs a distortion adjustment of the image frame by physically changing the arrangement state of the short focus type projector device 300. The distortion adjustment of the image frame by the user can be performed in accordance with the flow chart shown in FIG. 15. Since there is the possibility that the projection screen size or the focal distance of the projection image has shifted, after the distortion adjustment of the image frame has ended, it returns to step S2500, and the operations or processes of each of the steps are repeated in accordance with the above described flow. Finally, in step S3200, in the case where the focus of the projection image is in an appropriate state, and the user has determined that there are no distortions of the image frame (S3200: Yes), the image quality adjustment ends.

Note that, since the short focus type projector device 300 according to the present embodiment is constituted so that the back focus and the corner focus are automatically performed, the sequence of the adjustment of the back focus and the adjustment of the corner focus may be switched in the flow chart shown in FIG. 20.

As described above, according to the short focus type projector device 300 according to the present embodiment, the corner focus and the back focus are automatically adjusted. Therefore, a focus adjustment of a projection image can be performed with comparative ease, even if it is a short focus type projector device in which focus adjustment by a user is comparatively difficult. Specifically, the short focus type projector device 300 according to the present embodiment includes a projection distance sensor 95 for detecting a projection distance, and can appropriately adjust the corner focus, based on the detected projection distance information and the magnification ratio of the present projection image. Therefore, the short focus type projector device 300 according to the present embodiment can project a projection image of a screen size desired by a user with a high image quality.

<3. Summary>

It should be understood by those skilled in the art that various modifications, combinations, sub-combinations and alterations may occur depending on design requirements and other factors insofar as they are within the scope of the appended claims or the equivalents thereof.

For example, while the short focus type projector device 300 does not have a preset automatic adjustment function in the above described second embodiment, it may have the preset automatic adjustment function of the short focus type projector device 100 according to the first embodiment.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1) A projection type image display device including:
a light source;
an illumination optical system which uniformly radiates light flux emitted from the light source onto a surface of an image modulation element which becomes a primary image surface;
a projection optical system, capable of being set at a distance very close to a focal distance of a projection image, which magnifies and projects image information of the primary image surface modulated by the image modulation element onto a projection surface which becomes a secondary image surface; and
a corner focus control section capable of automatically adjusting a focal distance of at least corner regions of the projection image to a focal distance corresponding to a projection distance of the projection image.

(2) The projection type image display device according to (1),
wherein the corner focus control section is constituted to be capable of automatically adjusting a focal distance of at least the corner regions to a focal distance corresponding to a projection distance and a magnification ratio of the projection image.

(3) The projection type image display device according to (1) or (2),
wherein the corner focus control section is constituted so as to automatically adjust a focal distance of the corner regions to a focal distance corresponding to a projection distance of the projection image, based on a correlation between the projection distance and a focal distance of the corner regions corresponding to a magnification ratio of the projection image.

(4) The projection type image display device according to any one of (1) to (3),
wherein at least one preset value, stored by associating a focal distance of the corner regions with the projection distance, is set, and the corner focus control section is constituted so as to automatically adjust a focal distance of the corner regions in accordance with a preset value selected by a user.

(5) The projection type image display device according to any one of (1) to (4), further including:
a back focus control section capable of adjusting a focal distance of at least a central region of the projection image, and a zoom control section capable of adjusting a magnification ratio of the projection image,
wherein at least one preset value group, stored by mutually associating a focal distance of the central region, a focal distance of the corner regions, and the magnification ratio in accordance with a projection distance of the projection image, is set in advance, and wherein the back focus control section, the corner focus control section, and the zoom control section are constituted so as to automatically adjust a focal distance of the central region, a focal distance of the corner regions, and the magnification ratio in accordance with a preset value group selected by a user.

(6) The projection type image display device according to (5),
wherein the preset value group is capable of being set by the user.

(7) The projection type image display device according to any one of (1) to (6), further including:
a projection distance detection section which detects the projection distance,
wherein the corner focus control section is constituted so as to perform the automatic adjustment on a focal distance of the corner regions in accordance with a detected projection distance.

(8) The projection type image display device according to (7),
wherein the corner focus control section is constituted so as to perform the automatic adjustment, based on a correlation between the projection distance and a focal distance of the corner regions corresponding to a magnification ratio of at least two of the projection images stored in advance, by obtaining the correlation corresponding to a magnification ratio of the projection image to be set, and obtaining a focal distance of the corner regions corresponding to the projection distance.

(9) The projection type image display device according to any one of (2) to (8),
wherein the corner focus control section is constituted so as to automatically adjust a focal distance of the corner regions in the case where there has been a change of a magnification ratio of the projection image.

(10) The projection type image display device according to any one of (1) to (9),
wherein the corner focus control section is constituted to be capable of further adjusting a focal distance of the corner regions in accordance with an operation of a user.

(11) A control method of a projection type image display device, the method including: automatically adjusting a focal distance of at least corner regions of a projection image, magnified and projected onto a distance very close to a projection surface, to a focal distance corresponding to a projection distance of the projection image.

REFERENCE SIGNS LIST 10 projection optical system
12 corner focus lens
14 zoom lens
16 back focus lens
30 illumination optical system
40 light source
50 driver circuit
50a back focus lens drive circuit
50b corner focus lens drive circuit
50c zoom lens circuit
60 storage section
70 operation panel
80 remote controller
90 housing
95 projection distance sensor
100, 300 short focus type projector device (projection type image display device)
200, 400 display processing device
200a, 400a back focus control section
200b, 400b corner focus control section
200c, 400c zoom control section
200d preset value setting section

The invention claimed is:

1. A projection type image display device comprising:
a light source;
an illumination optical system which uniformly radiates light flux emitted from the light source onto a surface of an image modulation element which becomes a primary image surface;
a projection optical system configured to magnify and project image information of the primary image surface modulated by the image modulation element onto a projection surface which becomes a secondary image surface;
a back focus control section including at least a first lens and circuitry configured to adjust a focal distance of at least a central region of a projection image; and
a corner focus control section including at least a second lens and circuitry configured to automatically adjust a focal distance of at least corner regions of the projection image to a focal distance corresponding to a projection distance of the projection image.

2. The projection type image display device according to claim 1, wherein
the corner focus control section is configured to automatically adjust the focal distance of at least the corner regions to the focal distance corresponding to the projection distance and a magnification ratio of the projection image.

3. A projection type image display device comprising:
a light source;
an illumination optical system which uniformly radiates light flux emitted from the light source onto a surface of an image modulation element which becomes a primary image surface;
a projection optical system configured to magnify and project image information of the primary image surface modulated by the image modulation element onto a projection surface which becomes a secondary image surface; and
a corner focus control section including at least a first lens and circuitry configured to automatically adjust a focal distance of at least corner regions of a projection image to a focal distance corresponding to a projection distance of the projection image, wherein
the corner focus control section is constituted so as to automatically adjust the focal distance of the corner regions to the focal distance corresponding to the projection distance of the projection image, based on a correlation between the projection distance and a focal distance of the corner regions corresponding to a magnification ratio of the projection image.

4. The projection type image display device according to claim 1, wherein
at least one preset value, stored by associating the focal distance of the corner regions with the projection distance, is set, and the corner focus control section is constituted so as to automatically adjust the focal distance of the corner regions in accordance with a preset value selected by a user.

5. A projection type image display device comprising:
a light source;
an illumination optical system which uniformly radiates light flux emitted from the light source onto a surface of an image modulation element which becomes a primary image surface;
a projection optical system configured to magnify and project image information of the primary image surface modulated by the image modulation element onto a projection surface which becomes a secondary image surface;
a corner focus control section including at least a first lens and circuitry configured to automatically adjust a focal distance of at least corner regions of a projection image to a focal distance corresponding to a projection distance of the projection image; and
a back focus control section capable of adjusting a focal distance of at least a central region of the projection image, and a zoom control section capable of adjusting a magnification ratio of the projection image, wherein
at least one preset value group, stored by mutually associating the focal distance of the central region, the focal distance of the corner regions, and the magnification ratio in accordance with the projection distance of the projection image, is set in advance, and
the back focus control section, the corner focus control section, and the zoom control section are constituted so as to automatically adjust the focal distance of the central region, the focal distance of the corner regions, and the magnification ratio in accordance with a preset value group of the at least one preset value group selected by a user.

6. The projection type image display device according to claim 5, wherein the preset value group is capable of being set by the user.

7. A projection type image display device comprising:
a light source;
an illumination optical system which uniformly radiates light flux emitted from the light source onto a surface of an image modulation element which becomes a primary image surface;
a projection optical system configured to magnify and project image information of the primary image surface modulated by the image modulation element onto a projection surface which becomes a secondary image surface;
a projection distance sensor configured to detect a projection distance between the image display device and the projection surface;
a back-focus control section including at least a first lens and circuitry configured to adjust a focal distance of at least a central region of the projection image; and a corner focus control section including at least a second lens and circuitry configured to automatically adjust a focal distance of at least corner regions of the projection image to a focal distance corresponding to the projection distance of the projection image in accordance with the projection distance.

8. The projection type image display device according to claim 7, wherein
the corner focus control section is configured to perform the automatic adjustment, based on a correlation between the projection distance and a focal distance of the corner regions corresponding to a magnification ratio of at least two projection images stored in advance, by obtaining the correlation corresponding to a magnification ratio of the projection image to be set, and obtaining the focal distance of the corner regions corresponding to the projection distance.

9. The projection type image display device according to claim 2, wherein
the corner focus control section is configured to automatically adjust the focal distance of the corner regions in the case where there has been a change of the magnification ratio of the projection image.

10. The projection type image display device according to claim 1, wherein
the corner focus control section is configured to further adjust the focal distance of the corner regions in accordance with an operation of a user.

11. The projection type image display device of claim 1, wherein
the corner focus control section is configured to automatically adjust the focal distance of the corner regions of throjection image by automatically adjusting a position of the second lens.

* * * * *